(12) United States Patent
Sakamoto et al.

(10) Patent No.: US 11,315,701 B2
(45) Date of Patent: Apr. 26, 2022

(54) COVERED ELECTRICAL WIRE, TERMINAL-EQUIPPED ELECTRICAL WIRE, COPPER ALLOY WIRE, AND COPPER ALLOY STRANDED WIRE

(71) Applicants: SUMITOMO ELECTRIC INDUSTRIES, LTD., Osaka (JP); AUTONETWORKS TECHNOLOGIES, LTD., Mie (JP); SUMITOMO WIRING SYSTEMS, LTD., Mie (JP)

(72) Inventors: Kei Sakamoto, Osaka (JP); Akiko Inoue, Osaka (JP); Tetsuya Kuwabara, Osaka (JP); Minoru Nakamoto, Osaka (JP); Yusuke Oshima, Osaka (JP); Yoshihiro Nakai, Osaka (JP); Kazuhiro Nanjo, Osaka (JP); Taichiro Nishikawa, Osaka (JP); Kiyotaka Utsunomiya, Osaka (JP); Yasuyuki Ootsuka, Mie (JP); Kinji Taguchi, Mie (JP); Hiroyuki Kobayashi, Mie (JP)

(73) Assignees: Sumitomo Electric Industries, Ltd., Osaka (JP); AutoNetworks Technologies, Ltd., Yokkaichi (JP); Sumitomo Wiring Systems. Ltd., Yokkaichi (JP)

(*) Notice: Subject to any disclaimer, the term of this patent is extended or adjusted under 35 U.S.C. 154(b) by 0 days.

(21) Appl. No.: 16/347,867

(22) PCT Filed: Jun. 21, 2017

(86) PCT No.: PCT/JP2017/022928
§ 371 (c)(1),
(2) Date: May 7, 2019

(87) PCT Pub. No.: WO2018/083836
PCT Pub. Date: May 11, 2018

(65) Prior Publication Data
US 2019/0355489 A1    Nov. 21, 2019

(30) Foreign Application Priority Data

Nov. 7, 2016  (JP) ............... JP2016-217040
Dec. 28, 2016  (WO) ............... PCT/JP2016/089161

(51) Int. Cl.
*H01B 1/02* (2006.01)
*C22C 9/02* (2006.01)
(Continued)

(52) U.S. Cl.
CPC ............ *H01B 1/026* (2013.01); *C22C 9/00* (2013.01); *C22C 9/02* (2013.01); *C22F 1/08* (2013.01);
(Continued)

(58) Field of Classification Search
CPC ...................................... H01B 1/026
See application file for complete search history.

(56) References Cited

U.S. PATENT DOCUMENTS

| 5,508,001 A * | 4/1996 | Suzuki ............... C22C 9/06 148/433 |
| 2005/0092404 A1 | 5/2005 | Aruga et al. |

(Continued)

FOREIGN PATENT DOCUMENTS

| CN | 101522926 A | 9/2009 |
| JP | 07-242965 | * 9/1995 |

(Continued)

OTHER PUBLICATIONS

U.S. Appl. No. 16/348,020, filed May 7, 2019.
(Continued)

*Primary Examiner* — Chau N Nguyen
(74) *Attorney, Agent, or Firm* — Baker Botts L.L.P.; Michael A. Sartori

(57) ABSTRACT

A covered electrical wire comprising a conductor and an insulating covering layer provided outside the conductor, the conductor being a stranded wire composed of a strand of a plurality of copper alloy wires: composed of a copper alloy containing Fe in an amount of 0.1% by mass or more and 1.6% by mass or less, P in an amount of 0.05% by mass or more and 0.7% by mass or less, and Sn in an amount of 0.05% by mass or more and 0.7% by mass or less, with the balance being Cu and impurities; and having a wire diameter of 0.5 mm or less, the copper alloy wire having a tensile strength of 385 MPa or more and a work-hardening exponent of 0.1 or more.

7 Claims, 2 Drawing Sheets

(51) Int. Cl.
*H01B 7/22* (2006.01)
*C22C 9/00* (2006.01)
*C22F 1/08* (2006.01)
*H01B 7/00* (2006.01)
*H02G 15/02* (2006.01)
*H01R 4/18* (2006.01)

(52) U.S. Cl.
CPC ............ *H01B 7/0009* (2013.01); *H01B 7/22* (2013.01); *H01R 4/185* (2013.01); *H02G 15/02* (2013.01)

(56) References Cited

U.S. PATENT DOCUMENTS

| | | | | |
|---|---|---|---|---|
| 2009/0010797 | A1* | 1/2009 | Aruga | C22C 9/00 420/472 |
| 2009/0116996 | A1* | 5/2009 | Aruga | C22C 9/02 420/472 |
| 2010/0072584 | A1* | 3/2010 | Aruga | C22C 9/00 257/666 |
| 2012/0018192 | A1* | 1/2012 | Takahashi | C22C 9/00 174/128.1 |
| 2016/0284437 | A1 | 9/2016 | Inoue et al. | |
| 2017/0271567 | A1* | 9/2017 | Nishimura | C22C 9/00 |
| 2017/0283910 | A1* | 10/2017 | Tsuru | C22C 9/00 |
| 2018/0102199 | A1 | 4/2018 | Uegaki et al. | |

FOREIGN PATENT DOCUMENTS

| | | | |
|---|---|---|---|
| JP | 2007-023305 | * | 2/2007 |
| JP | 2013-139623 | * | 7/2013 |
| JP | 2014-156617 A | | 8/2014 |
| WO | 2016/170992 A1 | | 10/2016 |

OTHER PUBLICATIONS

Non-Final Office Action issued in U.S. Appl. No. 16/348,020, dated Oct. 25, 2019.
Office Action issued in U.S. Appl. No. 16/348,020 dated Mar. 23, 2020.
Office Action issued in U.S. Appl. No. 16/348,020 dated Jul. 31, 2020.
Office Action issued in U.S. Appl. No. 16/348,020 dated Dec. 1, 2020.
Office Action issued in U.S. Appl. No. 16/348,020 dated Mar. 31, 2021.
Office Action issued in U.S. Appl. No. 16/348,020 dated Aug. 12, 2021.
Notice of Allowance issued in U.S. Appl. No. 16/348,020 dated Dec. 22, 2021.

* cited by examiner

COVERED ELECTRICAL WIRE, TERMINAL-EQUIPPED ELECTRICAL WIRE, COPPER ALLOY WIRE, AND COPPER ALLOY STRANDED WIRE

The present application claims priority based on Japanese Patent Application No. 2016-217040 dated Nov. 7, 2016 and International Application PCT/JP2016/089161 dated Dec. 28, 2016, and incorporates all the contents described in the above Japanese and International Applications.

TECHNICAL FIELD

The present invention relates to a covered electrical wire, a terminal-equipped electrical wire, a copper alloy wire, and a copper alloy stranded wire.

BACKGROUND ART

Conventionally, a wire harness composed of a plurality of terminal-equipped electrical wires bundled together is used for a wiring structure of an automobile, an industrial robot or the like. An electrical wire equipped with a terminal is an electrical wire having an end covered with an insulating cover layer, through which a conductor is exposed and a terminal such as a crimp terminal is attached to the conductor. Typically, each terminal is inserted into one of terminal holes provided in a connector housing, and is mechanically connected to the connector housing. The electrical wire is connected to the body of a device via the connector housing. Such connector housings may be connected to each other to thus connect electrical wires to each other. Copper or a similar, copper-based material is mainly used as a constituent material of the conductor (for example, see Patent Literature 1).

CITATION LIST

Patent Literature

PTL 1: Japanese Patent Laying-Open No. 2014-156617

SUMMARY OF INVENTION

According to the present disclosure, a covered electrical wire is a covered electrical wire comprising a conductor and an insulating covering layer provided outside the conductor, the conductor being a stranded wire composed of a strand of a plurality of copper alloy wires:

composed of a copper alloy containing
    Fe in an amount of 0.1% by mass or more and 1.6% by mass or less,
    P in an amount of 0.05% by mass or more and 0.7% by mass or less, and
    Sn in an amount of 0.05% by mass or more and 0.7% by mass or less,
    with the balance being Cu and impurities; and
having a wire diameter of 0.5 mm or less,
the copper alloy wire having a tensile strength of 385 MPa or more and a work-hardening exponent of 0.1 or more.

According to the present disclosure, a terminal-equipped electrical wire comprises:

the covered electrical wire according the present disclosure; and a terminal attached to an end of the covered electrical wire.

According to the present disclosure, a copper alloy wire is a copper alloy wire used for a conductor, the copper alloy wire:
    being composed of a copper alloy containing
        Fe in an amount of 0.1% by mass or more and 1.6% by mass or less,
        P in an amount of 0.05% by mass or more and 0.7% by mass or less, and
        Sn in an amount of 0.05% by mass or more and 0.7% by mass or less,
    with the balance being Cu and impurities; and
    having a wire diameter of 0.5 mm or less,
    a tensile strength of 385 MPa or more, and
    a work hardening exponent of 0.1 or more.

According to the present disclosure, a copper alloy stranded wire is formed of a strand of a plurality of copper alloy wires each according to the present disclosure.

DETAILED DESCRIPTION

Figure 1:
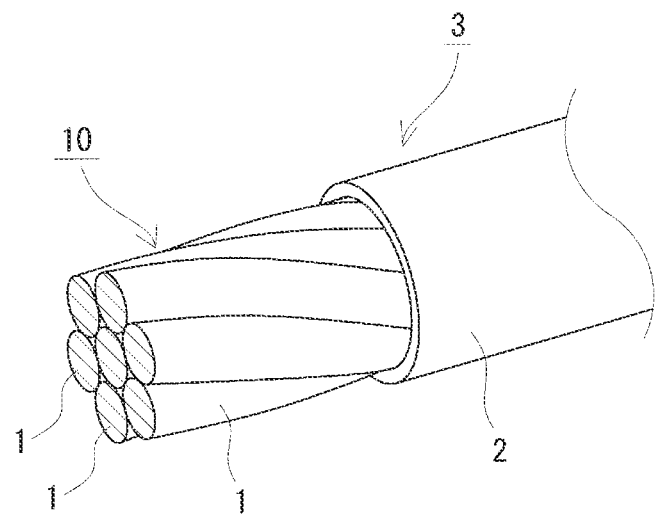
FIG. 1 is a schematic perspective view showing a covered electrical wire according to an embodiment.

[Problem to be Solved by the Present Disclosure]

There is a demand for an electrical wire which is excellently conductive and excellent in strength and also excellent in impact resistance. In particular, there is a demand for an electrical wire which is hard to break against impact even when the electrical wire has a conductor composed of a thin wire member.

In recent years, as automobiles are increasingly enhanced in performance and function, more electric devices and control devices of a variety of types are mounted on the automobiles, and accordingly, more electrical wires tend to be used for these devices. This also tends to increase the electrical wires in weight. On the other hand, for preservation of environment, it is desirable to reduce electrical wires in weight for the purpose of improving fuel economy of automobiles. Although a wire member composed of a copper-based material as described above easily has high conductivity, it easily has a large weight. For example, if a thin copper based wire member having a wire diameter of 0.5 mm or less is used for a conductor, it is expected to achieve high strength through work hardening, and weight reduction by small diameter. However, such a thin wire member as described above has a small cross section, and when it receives an impact, it tends to do so with small force and accordingly, it is easily broken when it receives an impact. Accordingly, there is a demand for a copper based wire member which is excellent in impact resistance even when it is thin as described above.

An electrical wire used with a terminal such as a crimp terminal attached thereto as described above has its conductor compressed at a terminal attachment portion, which has a cross section smaller in area than that of the remaining portion of the conductor (hereinafter also referred to as the main wire portion). Accordingly, the terminal attachment portion of the conductor tends to be a portion easily broken when it receives an impact. Therefore, there is a demand for even such a thin copper-based wire member described above to have a terminal attachment portion and a vicinity thereof not easily broken when it receives an impact, that is, to be also excellent in impact resistance in a state with a terminal attached thereto.

Furthermore, when electrical wires applied to automobiles or the like are routed therein or connected to a connector housing, they may be pulled, bent or twisted, or they may receive vibration in use. Electrical wires applied to robots or the like may be bent or twisted in use. An electrical wire which is not easily broken when repeatedly bent or twisted and thus has excellent fatigue resistance, and an electrical wire which excellently fixes a terminal such as a crimp terminal, as described above, are more preferable.

Accordingly, it is an object to provide a covered electrical wire, a terminal-equipped electrical wire, a copper alloy wire, and a copper alloy stranded wire which are excellently conductive and excellent in strength, and in addition, also excellent in impact resistance.

[Advantageous Effect of the Present Disclosure]

The presently disclosed covered electrical wire, terminal-equipped electrical wire, copper alloy wire, and copper alloy stranded wire are excellently conductive and excellent in strength, and in addition, also excellent in impact resistance.

DESCRIPTION OF EMBODIMENTS

Initially, embodiments of the present invention will be enumerated and described.

(1) A covered electrical wire according to one aspect of the present disclosure is
a covered electrical wire comprising a conductor and an insulating covering layer provided outside the conductor,
the conductor being a stranded wire composed of a strand of a plurality of copper alloy wires:
composed of a copper alloy containing
Fe in an amount of 0.1% by mass or more and 1.6% by mass or less,
P in an amount of 0.05% by mass or more and 0.7% by mass or less, and
Sn in an amount of 0.05% by mass or more and 0.7% by mass or less,
with the balance being Cu and impurities; and
having a wire diameter of 0.5 mm or less,
the copper alloy wire having a tensile strength of 385 MPa or more and a work-hardening exponent of 0.1 or more.

The above-described stranded wire includes a plurality of copper alloy wires simply stranded together and in addition, such wires stranded together and subsequently compressed and thus formed, i.e., a so-called compressed stranded wire. This also applies to a copper alloy stranded wire of item (11) described later. A typical stranding method is concentric stranding.

When the copper alloy wire is a round wire its diameter is defined as a wire diameter, whereas when the copper alloy wire has a transverse cross section other than a circle, the diameter of a circle having an area equivalent to that of the transverse cross section is defined as a wire diameter.

Since the covered electrical wire described above comprises a wire member composed of a copper based material and having a small diameter for a conductor, the covered electrical wire is excellently conductive and excellent in strength, and in addition, light in weight. Since this copper alloy wire is composed of a copper alloy having a specific composition including Fe, P and Sn in a specific range, the above-described covered electrical wire is further excellently conductive and further excellent in strength and in addition, also excellent in impact resistance, as will be described below. In the copper alloy described above, Fe and P are typically present in a matrix phase (Cu) as precipitates and crystallites containing Fe and P such as $Fe_2P$ or a similar compound, and the elements effectively enhance strength through enhanced precipitation and effectively maintain high conductivity by reduction of solid solution in Cu. Further, Sn is included in a specific range, and enhanced solid solution of Sn further enhances strength effectively. The above described enhanced precipitation and enhanced solid solution provide high strength, and even when a heat treatment is performed to increase elongation or the like, the copper alloy wire has strength as high as 385 MPa or more, and also has high toughness and is thus also excellent in impact resistance. By appropriately adjusting a heat treatment condition in a manufacturing process, as will be described hereinafter, while a conductivity as high as 60% IACS or more and strength as high as 385 MPa or more are provided, excellent impact resistance is also provided. Such a covered electrical wire as described above, a copper alloy stranded wire constituting a conductor of the covered electrical wire, and a copper alloy wire serving as each elemental wire forming the copper alloy stranded wire can be said to have high conductivity, high strength and high toughness in a good balance.

In addition, the covered electrical wire also has excellent fatigue resistance as the covered electrical wire comprises a conductor mainly composed of a high strength copper alloy wire having a tensile strength of 385 MPa or more. In particular, when the covered electrical wire comprising as a conductor a strand of copper alloy wires having high strength and also having high toughness, as has been described above, is compared with an electrical wire comprising a solid wire of the same cross section as a conductor, the former's conductor (or strand) as a whole tends to be better in mechanical properties such as bendability and twistability and is thus more excellent in fatigue resistance.

Furthermore, the above stranded wire and copper alloy wire have a work-hardening exponent as large as 0.1 or more, so that when the wires are subjected to plastic-working, such as compression-working, accompanied by reduction in cross section, they are work-hardened to have a plastically worked portion enhanced in strength. Note that the covered electrical wire comprises a copper alloy wire per se having high strength, as described above, so that when it has a terminal such as a crimp terminal fixed thereto, the former fixes the latter with large force (see Test Example 1 described hereinafter). In addition, the high work-hardening exponent as described above allows work-hardening to enhance the conductor (or strand) at the terminal-connected portion in strength and thus allows the terminal to be further firmly fixed. Such a covered electrical wire as described above has a larger force to fix the terminal and thus further excellently fixes the terminal, and when the covered electrical wire receives an impact, the covered electrical wire has the terminal-connected portion hard to break and thus also has an excellent impact resistance in the state with the terminal attached.

(2) As an example of the covered electrical wire,
the copper alloy includes an embodiment containing one or more elements selected from C, Si, and Mn in an amount of 10 ppm or more and 500 ppm or less by mass in total.

C, Si, and Mn contained in a specific range functions as a deoxidizing agent for elements such as Fe, P, Sn, and the like to prevent/reduce oxidation of these elements to effectively, appropriately obtain high conductivity and high strength attributed to containing these elements. Furthermore, the above embodiment is also excellently conductive as it can suppress reduction in conductivity attributed to excessively containing C, Si, and Mn. Thus, the above-described embodiment is further excellently conductive and further excellent in strength.

(3) An example of the covered electrical wire described above is
an embodiment in which the copper alloy wire provides an elongation at break of 5% or more.

The above embodiment comprises a copper alloy wire having a large elongation at break as a conductor, and is thus excellent in impact resistance, and in addition, also hard to break even when bent or twisted, and thus also excellent in bendability and twistability.

(4) An example of the covered electrical wire described above includes
an embodiment in which the copper alloy wire has a conductivity of 60% IACS or more and a tensile strength of 400 MPa or more.

The above embodiment comprises a copper alloy wire having high conductivity and higher tensile strength as a conductor, and is thus excellently conductive and excellent in strength.

(5) An example of the covered electrical wire includes
an embodiment providing a terminal fixing force of 45 N or more.

How terminal fixing force, impact resistance energy in a state with a terminal attached, as will described hereinafter at items (6) and (12), and impact resistance energy, as will be described hereinafter at items (7) and (13), are measured will be described hereinafter (see Test Examples 1 and 2).

In the above embodiment, when a terminal such as a crimp terminal is attached, the terminal can be fixed firmly and hence excellently. Thus the above-described embodiment is excellently conductive and excellent in strength, and in addition, also excellent in impact resistance, and also presents excellent performance in fixing the terminal, and can thus be suitably used for the above-described terminal-equipped electrical wire and the like.

(6) An example of the above-described covered electrical wire includes
an embodiment in which an impact resistance energy in a state with the terminal attached is 3 J/m or more.

The above embodiment provides large impact resistance energy in a state with a terminal such as a crimp terminal attached, and it is hard to break at the terminal attachment portion even when receiving an impact in the state with the terminal attached. Thus the above-described embodiment is excellently conductive and excellent in strength, and excellent in impact resistance, and also has an excellent impact resistance in a state with a terminal attached thereto, and can be suitably used for the above-described terminal-equipped electrical wire and the like.

(7) An example of the covered electrical wire described above includes
an embodiment in which the covered electrical wire alone provides an impact resistance energy of 6 J/m or more.

In the above embodiment, the covered electrical wire per se has high impact resistance energy, and even when it receives an impact, it is hard to break, and thus excellent in impact resistance.

(8) An example of the covered electrical wire described above includes
an embodiment in which the copper alloy has a mass ratio of Fe/P of 4.0 or more.

The above embodiment contains Fe in a large amount relative to P, and it is easy to form a compound without excess or deficiency of Fe and P and it is thus possible to effectively prevent solid solution of excessive P in the matrix phase, and hence reduced conductivity. In this regard the above embodiment further easily maintains high conductivity of Cu and hence easily has higher conductivity.

(9) A terminal equipped electrical wire in one aspect of the present disclosure comprises:
the covered electrical wire according to any one of the above items (1) to (8);
and a terminal attached to an end of the covered electrical wire.

Since the above-described terminal-equipped electrical wire includes the covered electrical wire as described above, it is excellently conductive and excellent in strength, and in addition, also excellent in impact resistance, as has been described above. In addition, since the above-described terminal-equipped electrical wire includes the covered electrical wire as described above, it also has excellent fatigue resistance, excellently fixes the terminal, and has excellent impact resistance in a state with the terminal attached thereto, as has been described above.

(10) A copper alloy wire according to one aspect of the present disclosure is
a copper alloy wire used for a conductor, the copper alloy wire:
being composed of a copper alloy containing
Fe in an amount of 0.1% by mass or more and 1.6% by mass or less,
P in an amount of 0.05% by mass or more and 0.7% by mass or less, and
Sn in an amount of 0.05% by mass or more and 0.7% by mass or less,
with the balance being Cu and impurities; and
having a wire diameter of 0.5 mm or less,
a tensile strength of 385 MPa or more, and
a work hardening exponent of 0.1 or more.

The above-described copper alloy wire is a thin wire member composed of a copper-based material, and when it is used as a conductor for an electrical wire or the like in the form of a solid wire or a stranded wire, it is excellently conductive and excellent in strength, and in addition, contributes to weight reduction of the electrical wire. In particular, the above-described copper alloy wire is composed of a copper alloy having a specific composition including Fe, P and Sn in a specific range, and is further excellently conductive and excellent in strength, and in addition, also excellent in impact resistance, as has been described above. Therefore, by using the above-described copper alloy wire as a conductor of an electrical wire, it is possible to construct an electrical wire excellently conductive and excellent in strength and in addition, also excellent in impact resistance, and furthermore, an electrical wire also having excellent fatigue resistance, excellently fixing a terminal such as a crimp terminal, and having excellent impact resistance in a state with the terminal attached thereto.

(11) A copper alloy stranded wire according to one aspect of the present disclosure is formed of a plurality of copper alloy wires according to item (10) stranded together.

The above copper alloy stranded wire substantially maintains the composition and characteristics of the copper alloy wire of the above item (10), and is thus excellently conductive and excellent in strength, and in addition, also excellent in impact resistance. Therefore, by using the above-described copper alloy stranded wire as a conductor of an electrical wire, it is possible to construct an electrical wire which is excellently conductive and excellent in strength and in addition, also excellent in impact resistance, and furthermore, an electrical wire also having excellent fatigue resistance, excellently fixing a terminal such as a crimp terminal, and having excellent impact resistance in a state with the terminal attached thereto.

(12) An example of the above-described copper alloy stranded wire includes an embodiment in which an impact resistance energy in a state with a terminal attached is 1.5 J/m or more.

In the above embodiment, an impact resistance energy in a state with a terminal attached is high. A covered electrical wire comprising a copper alloy stranded wire of the above embodiment as a conductor and an insulating covering layer can construct a covered electrical wire having a higher impact resistance energy in a state with a terminal attached thereto, typically the covered electrical wire of the above item (6). Thus the above-described embodiment is excellently conductive and excellent in strength, and excellent in impact resistance, and in addition it can be suitably used for a conductor of a covered electrical wire which is further excellent in impact resistance in a state with a terminal attached thereto, a terminal-equipped electrical wire, and the like.

(13) An example of the above-described copper alloy stranded wire includes an embodiment in which the copper alloy stranded wire alone has an impact resistance energy of 4 J/m or more.

In the above embodiment, the copper alloy stranded wire per se has high impact resistance energy. A covered electrical wire comprising a copper alloy stranded wire of the above embodiment as a conductor and an insulating covering layer can construct a covered electrical wire having higher impact resistance energy, typically the covered electrical wire of the above item (7). Thus the above-described embodiment can be suitably applied to a conductor of a covered electrical wire, a terminal-equipped electrical wire, and the like which are excellently conductive and excellent in strength, and in addition, further excellent in impact resistance.

Details of Embodiments of the Present Invention

Hereinafter, the present invention will be described in embodiments in detail with reference to the drawings, as appropriate. In the figures, identical reference characters denote identically named components. A content of an element shall be a proportion by mass (% by mass or ppm by mass) unless otherwise specified.

[Copper Alloy Wire]

A copper alloy wire 1 of an embodiment is used as a conductor of an electrical wire such as a covered electrical wire 3 (see FIG. 1), and is composed of a copper alloy containing specific additive elements in a specific range. The copper alloy is a Fe—P—Sn—Cu alloy which contains Fe at 0.1% or more and 1.6% or less, P at 0.05% or more and 0.7% or less, Sn at 0.05% or more and 0.7% or less, with the balance being Cu and impurities. The impurities are mainly inevitable impurities. In addition, copper alloy wire 1 of an embodiment has a tensile strength of 385 MPa or more and a work-hardening exponent of 0.1 or more.

Initially, a composition of the copper alloy will be described in detail for each element.

(Composition)

•Fe

Fe is present mainly such that it precipitates at a matrix phase, or Cu, and contributes to enhancing strength such as tensile strength.

When Fe is contained in an amount of 0.1% or more, a precipitate including Fe and P can be produced satisfactorily, and by enhanced precipitation, copper alloy wire 1 can be excellent in strength. Further, the precipitation can suppress solid solution of P in the matrix phase to provide copper alloy wire 1 with high conductivity. Although depending on the amount of P and the manufacturing conditions, the strength of copper alloy wire 1 tends to increase as the Fe content increases. If high strength or the like is desired, the Fe content can be 0.2% or more, even more than 0.35%, 0.4% or more, 0.45% or more.

Fe contained in a range of 1.6% or less helps to suppress coarsening of Fe-containing precipitates and the like. This provides a wire which can reduce breakage starting from coarse precipitates and thus be excellent in strength, and in addition, is hard to break in its production process when undergoing wire-drawing or the like, and is thus also excellent in manufacturability. Although depending on the amount of P and the manufacturing conditions, the smaller the Fe content is, the easier it is to suppress coarsening of precipitates described above and the like. When it is desired to suppress coarsening of precipitates (and hence reduce breakage and a break in the wire), and the like, the Fe content can be 1.5% or less, and even 1.2% or less, 1.0% or less, less than 0.9%.

•P

In copper alloy wire 1, P mainly exists as a precipitate together with Fe and contributes to improvement in strength such as tensile strength, that is, mainly functions as a precipitation enhancing element.

When P is contained in an amount of 0.05% or more, a precipitate including Fe and P can be produced satisfactorily, and by enhanced precipitation, copper alloy wire 1 can be excellent in strength. Although depending on the amount of Fe and the manufacturing conditions, the strength of copper alloy wire 1 tends to increase as the P content increases. If high strength or the like is desired, the P content can be more than 0.1%, and even 0.11% or more, 0.12% or more. It is to be noted that it is permitted that a portion of the P contained functions as a deoxidizing agent and as a result is present as an oxide in the matrix phase.

P contained in a range of 0.7% or less helps to suppress coarsening of Fe and P-containing precipitates and the like and can reduce breakage, a break in the wire, and the like. Although depending on the amount of Fe and the manufacturing conditions, the smaller the P content is, the easier it is to suppress the coarsening described above. When it is desired to suppress coarsening of precipitates (and hence reduce breakage and a break in the wire), and the like, the P content can be 0.6% or less, even 0.5 or less, 0.35% or less, 0.3% or less, 0.25% or less.

•Fe/P

In addition to containing Fe and P in the above specified ranges, when Fe is appropriately included relative to P, especially when Fe is contained in an amount equal to or greater than P, it is easy to cause Fe and P to be present as a compound. As a result, enhanced precipitation can effectively enhance strength, as appropriate, and excessive solid solution of P can be reduced to effectively maintain the matrix phase's high conductivity, as appropriate, and copper alloy wire 1 can be excellently conductive and in addition, have high strength.

Quantitatively, the above copper alloy has a ratio of an Fe content relative to a P content, i.e., Fe/P, of 1.0 or more by mass. Fe/P of 1.0 or more allows enhanced precipitation and thereby a satisfactory strength enhancement effect, as described above, and hence excellent strength. If further high strength or the like is desired, Fe/P can be 1.5 or more, even 2.0 or more, 2.2 or more. Fe/P of 2.0 or more tends to allow the copper alloy to be more excellently conductive. Fe/P of 4.0 or more allows the copper alloy to be excellently conductive and in addition, excellent in strength. Larger Fe/P tends to allow the copper alloy to be further excellently conductive, and can be greater than 4.0, and even 4.1 or more. While Fe/P can be selected within a range for example of 30 or less, Fe/P of 20 or less, even 15 or less, 10 or less help to suppress coarsening of precipitates caused by excessive Fe.

•Sn

Sn is present mainly in the form of a solid solution in the matrix phase, or Cu, and contributes to improvement in strength such as tensile strength, i.e., mainly functions as a solid solution enhancing element.

When Sn is contained in an amount of 0.05% or more, copper alloy wire 1 can be further excellent in strength. The larger the Sn content is, the easier it is to have higher strength. When high strength is desired, the Sn content can be set to 0.08% or more, even 0.1% or more, 0.12% or more.

When Sn is contained in a range of 0.7% or less, reduction in conductivity attributed to excessive solid solution of Sn in Cu can be suppressed and copper alloy wire 1 can have high conductivity. In addition, reduction in workability caused by excessive solid solution of Sn can be suppressed, so that wire-drawing or similar plastic working can be easily done and excellent manufacturability can also be obtained. When high conductivity and satisfactory workability are desired, the Sn content can be 0.6% or less, even 0.55% or less, 0.5% or less.

Copper alloy wire 1 of an embodiment has high strength by enhanced precipitation of Fe and P and enhanced solid solution of Sn as described above. Therefore, even when artificial aging and softening are performed in the manufacturing process, significantly strong and tough copper alloy wire 1 can be obtained having high strength while also having large elongation or the like.

•C, Si, Mn

A copper alloy constituting copper alloy wire 1 of an embodiment can include an element having a deoxidizing effect for Fe, P, Sn and the like. Specifically, the copper alloy may contain one or more elements selected from C, Si and Mn in an amount of 10 ppm or more and 500 ppm or less in total as a proportion by mass.

If the manufacturing process is done in an oxygen-containing atmosphere such as the air, elements such as Fe, P, Sn and the like may be oxidized. If these elements become oxides, the above-described precipitates and the like cannot be appropriately formed and/or solid solution cannot be provided in the matrix phase, and accordingly, high conductivity and high strength by containing Fe and P and enhanced solid solution by containing Sn may not be effectively obtained as appropriate. These oxides serve as points allowing breakage to start in wire-drawing or the like, and may invite reduction in productivity. Including at least one element, preferably two elements, of C, Mn and Si, (in the latter case, C and Mn or C and Si are preferable), more preferably, all of the three elements in a specific range more reliably ensures that Fe and P are precipitated to provide enhanced precipitation and high conductivity and ensures enhanced solid solution of Sn to provide copper alloy wire 1 which is excellently conductive and has high strength.

When the above total content is 10 ppm or more, oxidation of elements such as Fe, as described above, can be prevented. The higher the above total content is, the easier it is to obtain an antioxidation effect, and the above total content can be 20 ppm or more, even 30 ppm or more.

If the above total content is 500 ppm or less, it is difficult to invite reduction in conductivity attributed to excessively containing these deoxidizer elements, and excellent conductivity can be provided. The smaller the above total content is, the easier it is to suppress reduction in conductivity, and accordingly, the above total content can be 300 ppm or less, even 200 ppm or less, 150 ppm or less.

The content of C alone is preferably 10 ppm or more and 300 ppm or less, more preferably 10 ppm or more and 200 ppm or less, particularly preferably 30 ppm or more and 150 ppm or less.

The content of Mn alone or the content of Si alone is preferably 5 ppm or more and 100 ppm or less, more preferably more than 5 ppm and 50 ppm or less. The total content of Mn and Si is preferably 10 ppm or more and 200 ppm or less, more preferably more than 10 ppm and 100 ppm or less.

When C, Mn and Si are contained in the above described ranges, respectively, it is easy to satisfactorily obtain the above-described antioxidation effect for elements such as Fe. For example, the content of oxygen in the copper alloy can be 20 ppm or less, 15 ppm or less, even 10 ppm or less.

(Structure)

A copper alloy constituting copper alloy wire 1 of an embodiment may have a structure in which precipitates and/or crystallites including Fe and P are dispersed. By having a structure in which precipitates or the like are dispersed, preferably a structure in which fine precipitates or the like are uniformly dispersed, it is expected to ensure high strength by enhanced precipitation, and high conductivity by reduction of solid solution of P or the like in Cu.

Further, the copper alloy may have a fine crystal structure. This helps the above-described precipitates or the like to be present such that they are uniformly dispersed, and further higher strength can be expected. In addition, there are few coarse crystal grains that can serve as breakage starting points, which also helps to increase toughness such as elongation and it is expected that further excellent impact resistance is provided. Further, in that case, when copper alloy wire 1 of the embodiment is used as a conductor of an electrical wire such as covered electrical wire 3 and a terminal such as a crimp terminal is attached to the conductor, the terminal can be firmly fixed and a force to fix the terminal can thus be easily increased.

Quantitatively, an average crystal grain size of 10 μm or less helps to obtain the effect described above, and it can be 7 μm or less, even 5 μm or less. The crystal grain size can be adjusted to have a predetermined size for example by adjusting manufacturing conditions (such as a degree of working and a heat treatment temperature, etc., which are also applied hereinafter) depending on the composition (Fe, P, Sn contents, the value of Fe/P etc., which are also applied hereinafter).

The average crystal grain size is measured as follows: A transverse cross section polished with a cross section polisher (CP) is taken and observed with a scanning electron microscope. From the observed image, an observation range of a predetermined area $S_0$ is taken and the number N of all crystals present in the observation range is counted. Area $S_0$ divided by the number N of crystals, i.e., $S_0/N$, is defined as an area Sg of each crystal grain, and the diameter of a circle having an area equivalent to area Sg of the crystal grain is defined as a diameter R of the crystal grain. An average of diameters R of crystal grains is defined as the average crystal grain size. The observation range can be a range in which the number N of crystals is 50 or more, or the entirety of the transverse cross section. By making the observation range sufficiently large as described above, it is possible to sufficiently reduce an error caused by what is other than crystals that can be present in area $S_0$ (such as precipitates).

(Wire Diameter)

When copper alloy wire 1 of the embodiment is manufactured through a process, it can undergo wire-drawing with an adjusted working ratio (or cross section reduction ratio) or the like to have a wire diameter of a predetermined size. In particular, when copper alloy wire 1 is a thin wire having a wire diameter of 0.5 mm or less, it can be suitably used for a conductor of an electrical wire for which reduction in weight is desired, e.g., a conductor for an electrical wire to be wired in an automobile. The wire diameter can be 0.35 mm or less, even 0.25 mm or less.

(Cross Sectional Shape)

Copper alloy wire 1 of an embodiment has a transverse cross sectional shape selected as appropriate. A representative example of copper alloy wire 1 is a round wire having a circular transverse cross sectional shape. The transverse cross sectional shape varies depending on the shape of a die used for wire-drawing, and the shape of a die when copper alloy wire 1 is a compressed stranded wire, etc. Copper alloy wire 1 can be, for example, a quadrangular wire having a rectangular or similar transverse cross-sectional shape, a shaped wire having a hexagonal or other polygonal shape, an elliptical shape or the like. Copper alloy wire 1 constituting the compressed stranded wire is typically a shaped wire having an indefinite transverse cross sectional shape.

(Characteristics)

According to an embodiment, copper alloy wire 1 is composed of a copper alloy having the above described specific composition, and is thus excellently conductive and in addition, has high strength. It is manufactured through an appropriate heat treatment to have high strength, high toughness and high conductivity in a good balance. Copper alloy wire 1 of such an embodiment can be suitably used as a conductor for covered electrical wire 3 or the like. In particular, copper alloy wire 1 of an embodiment has a tensile strength as high as 385 MPa or more and in addition, a work-hardening exponent of 0.1 or more, and is thus a wire member significantly effectively enhanced in strength through work hardening. For example, when copper alloy wire 1 is used as a conductor of an electrical wire such as covered electrical wire 3, and a terminal such as a crimp terminal is attached to the conductor by crimping or the like, the conductor has a terminal attachment portion, which is a worked portion having undergone plastic working such as compression-working. Although this worked portion has undergone plastic working, such as compression-working, accompanied by a reduction in cross section, it is harder than before plastic working and is enhanced in strength. Thus, the worked portion, that is, the terminal attachment portion of the conductor and a vicinity thereof can be a less weak point in strength. The portion of the conductor other than the terminal attachment portion has high strength, as has been described above, and accordingly, the terminal-equipped electrical wire can as a whole have high strength. Furthermore, copper alloy wire 1 having high toughness as described above also has excellent impact resistance in a state with a terminal attached. When copper alloy wire 1 has tensile strength of 390 MPa or more, even 395 MPa or more, 400 MPa or more, in particular, higher strength is provided.

—Tensile Strength, Elongation at Break, and Conductivity

Copper alloy wire 1 of an embodiment satisfies at least one of: a tensile strength of 400 MPa or more, an elongation at break of 5% or more, and a conductivity of 60% IACS or more, preferably two thereof, more preferably all of the three. An example of copper alloy wire 1 has a conductivity of 60% IACS or more and a tensile strength of 400 MPa or more. Alternatively, an example of copper alloy wire 1 has an elongation at break of 5% or more.

When higher strength is desired, the tensile strength can be set to 405 MPa or more, 410 MPa or more, even 415 MPa or more.

When higher toughness is desired, the elongation at break can be 6% or more, 7% or more, 8% or more, 9.5% or more, even 10% or more.

When higher conductivity is desired, the conductivity can be set to 62% IACS or more, 63% IACS or more, even 65% IACS or more.

—Work Hardening Exponent

A work hardening exponent is defined as an exponent n of a true strain $\varepsilon$ in an equation of $\sigma = C \times \varepsilon^n$ where $\sigma$ and $\varepsilon$ represent true stress and true strain, respectively, in a plastic strain region in a tensile test when a test force is applied in a uniaxial direction. In the above equation, C represents a strength parameter.

The above exponent n can be obtained by performing a tensile test using a commercially available tensile tester, and preparing an S-S curve (see also JIS G 2253 (2011)).

Larger work hardening exponents facilitate work hardening, and a thus worked portion can be effectively increased in strength through work hardening. A work hardening exponent of 0.11 or more, furthermore, 0.12 or more, 0.13 or more, helps work hardening to effectively enhance strength. Depending on the composition, the manufacturing conditions and the like, it can be expected that the conductor comprising copper alloy wire 1 has a terminal attachment portion which maintains a level of strength equivalent to that of the main wire portion of the conductor. The work hardening exponent varies depending on the composition, the manufacturing conditions and the like, and accordingly, its upper limit is not particularly specified.

The tensile strength, the elongation at break, the conductivity, and the work hardening exponent can be set as prescribed in magnitude by adjusting the composition, the manufacturing conditions and the like. For example, larger amounts of Fe, P, Sn and higher degrees of wire-drawing (or thinning the wire) tend to increase tensile strength. For example, when wire-drawing is followed by a heat treatment performed at high temperature, elongation at break and conductivity tend to be high and tensile strength tends to be low.

—Weldability

Copper alloy wire 1 of an embodiment also has excellent weldability as an effect. For example, when copper alloy wire 1 or a copper alloy stranded wire 10 described later is used as a conductor of an electric cable and another conductor wire or the like is welded thereto at a portion for branching from the conductor, the welded portion is hard to break, and is thus strongly welded.

[Copper Alloy Stranded Wire]

Copper alloy stranded wire 10 of an embodiment uses copper alloy wire 1 of an embodiment as an elemental wire, and is formed of a plurality of copper alloy wires 1 stranded together. Copper alloy stranded wire 10 substantially maintains the composition, structure and characteristics of copper alloy wire 1 serving as an elemental wire, and in addition, easily has a cross sectional area larger than in a case with a cross sectional area of a single elemental wire, and accordingly, can have an increased force to receive impact and is thus further excellent in impact resistance. In addition, when copper alloy stranded wire 10 is compared with a solid wire having the same cross-sectional area, the former is more easily bent and twisted and thus also excellent in bendability and twistability, and when it is used as a conductor of an electrical wire, it is hard to break even when routed or repeatedly bent. Furthermore, copper alloy stranded wire 10 has a plurality of copper alloy wires 1 that are easily work-hardened, as described above, and when it is used as a conductor of an electrical wire such as covered electrical wire 3 and a terminal such as a crimp terminal is attached thereto, the terminal can be further firmly fixed thereto. While FIG. 1 shows copper alloy strand wire 10 composed of seven wires concentrically stranded together as an example, how many wires are stranded together and how can be changed as appropriate.

After being stranded together, copper alloy stranded wire 10 can be compressed and thus formed to be a compressed stranded wire (not shown). A compressed stranded wire is excellent in stability in a stranded state, and when the compressed stranded wire is used as a conductor of an electrical wire such as covered electrical wire 3, insulating covering layer 2 or the like is easily formed on the outer circumference of the conductor. In addition, when the compressed stranded wire is compared with a simple strand, the former tends to have better mechanical properties and in addition, can be smaller in diameter than the latter.

Copper alloy stranded wire 10 can have a wire diameter, a cross-sectional area, a stranding pitch, and the like appropriately selected depending on the wire diameter of copper alloy wire 1, the cross-sectional area of copper alloy wire 1, the number of copper alloy wires is stranded together, and the like.

When copper alloy stranded wire 10 has a cross-sectional area for example of 0.03 mm$^2$ or more, the conductor will have a large cross-sectional area, and hence be small in electric resistance and excellently conductive. Further, when copper alloy stranded wire 10 is used as a conductor of an electrical wire such as covered electrical wire 3 and a terminal such as a crimp terminal is attached to the conductor, the conductor having a somewhat large cross sectional area facilitates attaching the terminal thereto. Furthermore, as has been described above, the terminal can be firmly fixed to copper alloy stranded wire 10, and excellent impact resistance in a state with the terminal attached is also provided. The cross-sectional area can be 0.1 mm$^2$ or more. When the cross-sectional area is, for example, 0.5 mm$^2$ or less, copper alloy stranded wire 10 can be lightweight.

When copper alloy stranded wire 10 has a stranding pitch for example of 10 mm or more, even elemental wires (or copper alloy wires 1) which are thin wires having a wire diameter of 0.5 mm or less can be easily stranded together, and copper alloy stranded wire 10 is thus excellent in manufacturability. A stranding pitch for example of 20 mm or less prevents the strand from being loosened when bent, and excellent bendability is thus provided.

—Impact Resistance Energy in State with Terminal Attached

Copper alloy stranded wire 10 of an embodiment is composed of elemental wire that is copper alloy wire 1 composed of a specific copper alloy as described above, and when stranded wire 10 is used for a conductor of a covered electrical wire or the like and a terminal such as crimp terminal is attached to an end of the conductor, and in that condition stranded wire 10 receives an impact, the terminal attachment portion and a vicinity thereof is hard to break. Quantitatively, copper alloy stranded wire 10 with the terminal attached thereto as described above has impact resistance energy of 1.5 J/m or more as an example. The greater the impact resistance energy in the state with the terminal attached is, the harder the terminal attachment portion and a vicinity thereof are to break when they receive an impact. When such a copper alloy stranded wire 10 is used as a conductor, a covered electrical wire or the like which is excellent in impact resistance in a state with a terminal attached thereto can be constructed. Copper alloy stranded wire 10 in the state with the terminal attached thereto preferably has an impact resistance energy of 1.6 J/m or more, more preferably 1.7 J/m or more, and no upper limit therefor is particularly specified.

—Impact Resistance Energy

Copper alloy stranded wire 10 of an embodiment is composed of elemental wire that is copper alloy wire 1 composed of a specific copper alloy as described above, and when stranded wire 10 receives an impact, it is hard to break. Quantitatively, copper alloy stranded wire 10 alone has an impact resistance energy of 4 J/m. The larger the impact resistance energy is, the harder copper alloy stranded wire 10 per se is to break when it receives an impact. When such a copper alloy stranded wire 10 is used as a conductor, a covered electrical wire or the like excellent in impact resistance can be constructed. Copper alloy stranded wire 10 preferably has an impact resistance energy of 4.2 J/m or more, more preferably 4.5 J/m or more, and no upper limit therefor is particularly specified.

Note that it is preferable that copper alloy wire 1 in the form of a solid wire also have an impact resistance energy satisfying the above range in a state with a terminal attached thereto and a state in which the wire is alone without any terminal attached thereto. When copper alloy stranded wire 10 of an embodiment in a state with a terminal attached thereto and a state in which the wire is alone without any terminal attached thereto is compared with copper alloy wire 1 in the form of a solid wire in the same states, the former tends to have higher impact resistance energy than the latter.

[Covered Electrical Wire]

While copper alloy wire 1 and copper alloy stranded wire 10 of an embodiment can be used as a conductor as they are, copper alloy wire 1 and copper alloy stranded wire 10 surrounded by an insulating covering layer are excellently insulative. Covered electrical wire 3 of an embodiment includes a conductor and insulating covering layer 2 surrounding the conductor, and the conductor is copper alloy stranded wire 10 of an embodiment. Another embodiment of the covered electrical wire is a covered electrical wire including a conductor implemented by copper alloy wire 1 (in the form of a solid wire). FIG. 1 shows an example with a conductor including copper alloy stranded wire 10.

Insulating covering layer 2 is composed of an insulating material for example including polyvinyl chloride (PVC), a non-halogen resin (for example, polypropylene (PP)), an excellently flame retardant material, and the like. Known insulating materials can be used.

Insulating covering layer 2 can be selected in thickness as appropriate depending on insulating strength as prescribed, and is thus not particularly limited in thickness.

—Terminal Fixing Force

As has been described above, covered electrical wire 3 of an embodiment comprises a conductor comprising copper alloy stranded wire 10 composed of an elemental wire that is copper alloy wire 1 composed of a specific copper alloy, and in a state with a terminal such as a crimp terminal attached thereto by crimping or the like, covered electrical wire 3 allows the terminal to be firmly fixed thereto. Quantitatively, covered electrical wire 3 has a terminal fixing force of 45 N or more. Larger terminal fixing force is preferable as it can firmly fix the terminal and easily maintains covered electrical wire 3 (the conductor) and the terminal in a connected state. The terminal fixing force is preferably 50 N or more, more than 55 N, further preferably 58 N or more, and no upper limit therefor is particularly specified.

—Impact Resistance Energy

When covered electrical wire 3 of an embodiment in a state with a terminal attached thereto and a state in which the wire is alone without any terminal attached thereto is compared with a bare conductor without insulating covering layer 2, that is, copper alloy stranded wire 10 of an embodiment, the former tends to have higher impact resistance energy than the latter. Depending on insulating covering layer 2's constituent materials, thickness or the like, covered electrical wire 3 in the state with the terminal attached thereto and covered electrical wire 3 alone may have impact resistance energy further increased as compared with the bare conductor. Quantitatively, covered electrical wire 3 in the state with the terminal attached thereto has an impact resistance energy of 3 J/m or more. When covered electrical wire 3 in the state with the terminal attached thereto has larger impact resistance energy, the terminal attachment portion is harder to break when it receives an impact, and the impact resistance energy is preferably 3.2 J/m or more, more preferably 3.5 J/m or more, and no upper limit therefor is particularly specified.

Furthermore, quantitatively, covered electrical wire 3 alone has an impact resistance energy (hereinafter also referred to as the main wire's impact resistance energy) of 6 J/m or more. The larger the main wire's impact resistance energy is, the harder the wire is to break when it receives an impact, and it is preferably 6.5 J/m or more, more preferably 7 J/m or more, and 8 J/m or more, and no upper limit therefor is particularly specified.

When covered electrical wire 3 has insulating covering layer 2 removed therefrom to be a conductor alone, that is, copper alloy stranded wire 10 alone, and this conductor has measured its impact resistance energy in a state with a terminal attached thereto and its impact resistance energy in a state in which the conductor is alone without any terminal attached thereto, the conductor assumes substantially the same value as copper alloy stranded wire 10 as described above. Specifically, the conductor comprised by covered electrical wire 3 in the state with the terminal attached to the conductor has an impact resistance energy of 1.5 J/m or more, and the conductor comprised by covered electrical wire 3 has an impact resistance energy of 4 J/m or more.

Note that it is preferable that a covered electrical wire comprising copper alloy wire 1 which is a solid wire as a conductor also have at least one of the terminal fixing force, the impact resistance energy in the state with the terminal attached, and the main wire's impact resistance energy satisfying the above-described range. When covered electrical wire 3 of an embodiment with a conductor comprising copper alloy stranded wire 10 is compared with a covered electrical wire using copper alloy wire 1 which is a solid wire as a conductor, the former tends to have a larger terminal fixing force, a larger impact resistance energy in the state with the terminal attached, and a larger impact resistance energy of the main wire than the latter.

Covered electrical wire 3 or the like of an embodiment can have the terminal fixing force, the impact resistance energy in the state with the terminal attached, and the main wire's impact resistance energy to be of a magnitude as prescribed by adjusting the composition, manufacturing conditions and the like of copper alloy wire 1, the constituent materials, thickness and the like of the insulating covering layer 2, and the like. For example, copper alloy wire 1 has its composition, manufacturing conditions and the like adjusted so that characteristic parameters such as the aforementioned tensile strength, elongation at break, conductivity, work hardening exponent and the like satisfy the above specified ranges.

[Terminal Equipped Electrical Wire]

Figure 2:
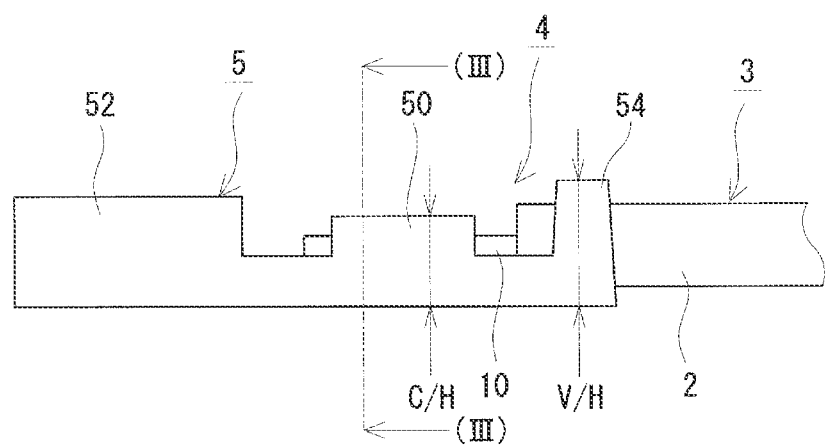
FIG. 2 is a schematic side view showing a vicinity of a terminal of a terminal-equipped electrical wire according to an embodiment.

As shown in FIG. 2, a terminal-equipped electrical wire 4 of an embodiment includes covered electrical wire 3 of an embodiment and a terminal 5 attached to an end of covered electrical wire 3. Herein, terminal 5 is a crimp terminal including at one end a female or male fitting portion 52 and at the other end an insulation barrel portion 54 for gripping insulating covering layer 2, and at an intermediate portion a wire barrel portion 50 for gripping the conductor (in FIG. 2, copper alloy stranded wire 10) by way of example. The crimp terminal is crimped to an end of the conductor that is exposed by removing insulating covering layer 2 at an end of covered electrical wire 3, and the crimp terminal is electrically and mechanically connected to the conductor. Other than a crimping type such as a crimp terminal, terminal 5 is of a weld type to which a molten conductor is connected as one example. A terminal-equipped electrical wire according to another embodiment comprises a covered electrical wire using copper alloy wire 1 (a solid wire) as a conductor.

Terminal-equipped electrical wire 4 may include an embodiment in which one terminal 5 is attached to each covered electrical wire 3, as shown in FIG. 2, and an embodiment in which one terminal 5 is provided for a plurality of covered electrical wires 3. That is, terminal-equipped electrical wire 4 includes an embodiment including one covered electrical wire 3 and one terminal 5, an embodiment including a plurality of covered electrical wires 3 and one terminal 5, and an embodiment including a plurality of covered electrical wires 3 and a plurality of terminals 5. When a plurality of electrical wires are provided, using a binder to bind the plurality of electrical wires together helps to easily handle terminal-equipped electrical wire 4.

[Characteristics of Copper Alloy Wire, Copper Alloy Stranded Wire, Covered Electrical Wire, Terminal-Equipped Electrical Wire]

According to an embodiment, each elemental wire of copper alloy stranded wire 10, each elemental wire constituting the conductor of covered electrical wire 3, and each elemental wire constituting the conductor of terminal-equipped electrical wire 4 all maintain copper alloy wire 1's composition, structure and characteristics or have characteristics equivalent thereto. Specifically, each of the above elemental wires has a tensile strength of 385 MPa or more and a work-hardening exponent of 0.1 or more. An example of each of the above elemental wires satisfies at least one of a tensile strength of 400 MPa or more, an elongation at break of 5% or more, and a conductivity of 60% IACS or more.

Terminal 5 such as a crimp terminal which terminal-equipped electrical wire 4 is per se equipped with can be used as a terminal used for measuring terminal-equipped electrical wire 4's terminal fixing force and impact resistance energy in the state with the terminal attached.

[Application of Copper Alloy Wire, Copper Alloy Stranded Wire, Covered Electrical Wire, and Terminal-Equipped Electrical Wire]

Covered electrical wire 3 of an embodiment can be used for wiring portions of various electric devices and the like. In particular, covered electrical wire 3 according to an embodiment is suitably used in applications with terminal 5 attached to an end of covered electrical wire 3, e.g., transporting vehicles such as automobiles and airplanes, controllers for industrial robots, and the like. Terminal-equipped electrical wire 4 of an embodiment can be used for wiring of various electric devices such as the above-described transporting vehicles and controllers. Covered electrical wire 3 and terminal-equipped electrical wire 4 of such an embodiment can be suitably used as constituent elements of various wire harnesses such as automobile wire harnesses. The wire harness including covered electrical wire 3 and terminal-equipped electrical wire 4 according to an embodiment easily maintains connection with terminal 5 and can thus enhance reliability. Copper alloy wire 1 of an embodiment and copper alloy stranded wire 10 of an embodiment can be used as a conductor of an electrical wire such as covered electrical wire 3 and terminal-equipped electrical wire 4.

[Effect]

Copper alloy wire 1 of an embodiment is composed of a specific copper alloy containing Fe, P and Sn in a specific range, and is thus excellently conductive and excellent in strength, and in addition, also excellent in impact resistance. In particular, copper alloy wire 1 of an embodiment has high strength as high as 385 MPa or more and in addition, a work-hardening exponent as large as 0.1 or more, and when copper alloy wire 1 has terminal 5 such as a crimp terminal crimped thereto, copper alloy wire 1 can firmly fix terminal 5, and in addition, it is also excellent in impact resistance in a state with terminal 5 attached. Copper alloy stranded wire 10 of an embodiment having copper alloy wire 1 of an embodiment as an elemental wire is similarly excellently conductive and excellent in strength, and in addition, also excellent in impact resistance. Furthermore, when copper alloy stranded wire 10 of an embodiment is used for a conductor for covered electrical wire 3 or the like and has terminal 5 attached thereto, copper alloy stranded wire 10 can firmly fix terminal 5, and in addition, it is also excellent in impact resistance in a state with terminal 5 attached.

Covered electrical wire 3 of an embodiment comprises a conductor comprising copper alloy stranded wire 10 of an embodiment comprising copper alloy wire 1 of an embodiment as an elemental wire, and covered electrical wire 3 is thus excellently conductive and excellent in strength, and in addition, also excellent in impact resistance. Furthermore, when covered electrical wire 3 has terminal 5 such as a crimp terminal crimped thereto, covered electrical wire 3 can firmly fix terminal 5, and in addition, it is also excellent in impact resistance in a state with the terminal attached.

Terminal-equipped electrical wire 4 of an embodiment that comprises covered electrical wire 3 of an embodiment is excellently conductive and excellent in strength, and in addition, also excellent in impact resistance. Furthermore, terminal-equipped electrical wire 4 can firmly fix terminal 5, and in addition, it is also excellent in impact resistance in a state with the terminal attached.

These effects will specifically be described in Test Examples 1 and 2.

[Manufacturing Method]

Copper alloy wire 1, copper alloy stranded wire 10, covered electrical wire 3, and terminal-equipped electrical wire 4 according to an embodiment can be manufactured by a manufacturing method including, for example, the following steps. Hereinafter, each step will be outlined.

(Copper Alloy Wire)

<Continuous Casting Step> A copper alloy having a specific composition including Fe, P and Sn in a specified range as described above is molten and continuously cast to prepare a cast material.

<Wire-Drawing Step> The cast material or a worked material obtained by working the cast material is subjected to wire-drawing to produce a wire-drawn member.

<Heat Treatment Step> The wire-drawn member is subjected to a heat treatment to produce a heat-treated member.

Typically, this heat treatment is assumed to include artificial aging to provide precipitates containing Fe and P from a copper alloy including Fe and P in a state of solid solution, and softening to improve elongation of a wire-drawn member work-hardened by wire-drawing done to attain a final wire diameter. Hereinafter, this heat treatment will be referred to as an aging/softening treatment.

A heat treatment other than the aging/softening treatment can include the following solution treatment.

The solution treatment is a heat treatment one purpose of which is to provide a supersaturated solid solution, and the treatment can be applied at any time after the continuous casting step before the aging/softening treatment.

(Copper Alloy Stranded Wire)

Manufacturing copper alloy stranded wire 10 comprises the above-described <continuous casting step>, <wire drawing step> and <heat treatment step> and in addition thereto, the following wire stranding step. When forming a compressed stranded wire, the following compression step is further comprised.

<Wire stranding step> A plurality of wire-drawn members each as described above are twisted together to manufacture a stranded wire. Alternatively, a plurality of heat-treated members each as described above are twisted together to manufacture a stranded wire.

<Compression Step> The stranded wire is compression-molded into a predetermined shape to produce a compressed stranded wire.

When the <wire stranding step> and the <compression step> are comprised, the <heat treatment step> is performed to apply the aging/softening heat treatment to the stranded wire or the compressed stranded wire. When producing a stranded wire or compressed stranded wire of the above heat treated material, a second heat treatment step of further subjecting the stranded wire or the compressed stranded wire to an aging/softening heat treatment may be comprised or dispensed with. When the aging/softening heat treatment is performed a plurality of times, a heat treatment condition can be adjusted so that the above-described characteristic parameter satisfies a specific range. By adjusting the heat treatment condition, for example it is easy to suppress growth of crystal grains to form a fine crystal structure, and it is easy to have high strength and high elongation.

(Covered Electrical Wire)

Manufacturing covered electrical wire 3 comprising copper alloy stranded wire 10, a covered electrical wire comprising copper alloy wire 1 in the form of a solid wire, and the like comprises a covering step to form an insulating covering layer to surround a copper alloy wire (copper alloy wire 1 of an embodiment) manufactured in the above-described copper alloy wire manufacturing method or a copper alloy stranded wire (copper alloy stranded wire 10 of an embodiment) manufactured in the above-described copper alloy stranded wire manufacturing method. The insulating covering layer can be formed in known methods such as extrusion-coating and powder-coating.

(Terminal-Equipped Electrical Wire)

Manufacturing terminal-equipped electrical wire 4 comprises a crimping step in which the insulating covering layer is removed at an end of a covered electrical wire that is manufactured by the above-described method of manufacturing a covered electrical wire (e.g., covered electrical wire 3 or the like of an embodiment) to expose a conductor and a terminal is attached to the exposed conductor.

Hereinafter, the continuous casting step, the wire drawing step, and the heat treatment step will be described in detail.

<Continuous Casting Step>

In this step, a copper alloy having a specific composition including Fe, P and Sn in a specified range as described above is molten and continuously cast to prepare a cast material. Melting the copper alloy in a vacuum atmosphere can prevent oxidation of elements such as Fe, P, Sn. In contrast, doing so in an atmosphere of the air eliminates the necessity of controlling the atmosphere and can thus contribute to increased productivity. In that case, to prevent the above elements from oxidation due to oxygen in the atmosphere, it is preferable to use the above-described C, Mn, Si (or deoxidizer elements).

C (carbon) is added for example by covering the surface of the melt with charcoal chips, charcoal powder or the like. In that case, C can be supplied into the melt from charcoal chips, charcoal powder or the like in a vicinity of the surface of the melt.

Mn and Si may be added by preparing a source material containing the elements, and mixing the source material with the melt. In that case, even if a portion exposed in the surface of the melt through gaps formed by the charcoal chips or charcoal powder comes into contact with oxygen in the atmosphere, the portion can be prevented from oxidation in the vicinity of the surface of the melt. Examples of the source material include Mn and Si as simple substances, Mn or Si and Fe alloyed together, and the like.

In addition to adding the above deoxidizer element, it is preferable to use a crucible, a mold or the like of a high-purity carbon material having few impurities as doing so makes it difficult to introduce impurities into the melt.

Note that copper alloy wire 1 of an embodiment typically causes Fe and P to be present as precipitates and Sn to be present as a solid solution. Therefore, it is preferable that copper alloy wire 1 is manufactured through a process comprising a process for forming a supersaturated solid solution. For example, a solution treatment step for performing a solution treatment can be separately provided. In that case, the supersaturated solid solution can be formed at any time. When continuous casting is performed with an increased cooling rate to prepare a cast material of a supersaturated solid solution, it is not necessary to separately provide a solution treatment step, and copper alloy wire 1 can be manufactured which finally has excellent electrical and mechanical properties and is thus suitable for a conductor of covered electrical wire 3 or the like. Accordingly, as a method for manufacturing copper alloy wire 1, it is proposed to perform continuous casting, and applying a fast cooling rate to a cooling process to provide rapid cooling, in particular.

As a continuous casting method, various methods can be used such as a belt and wheel method, a twin belt method, an up-cast method and the like. In particular, the up-cast method is preferred because it can reduce impurities such as oxygen and easily prevent oxidation of Cu, Fe, P, Sn and the like. The cooling rate in the cooling process is preferably higher than 5° C./sec, more preferably higher than 10° C./sec, 15° C./sec or higher.

Various types of plastic working, cutting and other processing can be applied to the cast material. Plastic working includes conform extrusion, rolling (hot, warm, cold), and the like. Cutting includes stripping and the like. These workings can reduce the cast material's surface defects, so that in wire drawing, a break of a wire can be reduced to contribute to increased productivity. In particular, when these workings are applied to an upcast material, the resultant wire is hard to break.

<Wire Drawing Step>

In this step, the cast material, the cast material having been worked, or the like undergoes at least one pass, typically a plurality of passes, of wire-drawing (cold) to prepare a wire-drawn member having a final wire diameter. When a plurality of passes is applied, a degree of working for each pass may be appropriately adjusted depending on the composition, the final wire diameter, and the like. When wire drawing is preceded by an intermediate heat treatment, a plurality of passes and the like, the intermediate heat treatment can be performed between passes to enhance workability. The intermediate heat treatment can be done under a condition which is appropriately selected so as to obtain desired workability.

<Heat Treatment Step>

In this step, an aging/softening treatment aimed at artificial aging and softening as described above is performed. This aging/softening treatment can enhance precipitation of precipitates or the like to provide effectively increased strength and can reduce solid solution in Cu to effectively maintain high conductivity, as described above, satisfactorily, and copper alloy wire 1, copper alloy stranded wire 10 and the like which are excellently conductive and excellent in strength can thus be obtained. In addition, by the aging/softening treatment, it is possible to improve toughness such as elongation while maintaining high strength, and copper alloy wire 1 and copper alloy stranded wire 10 also excellent in toughness can be obtained.

The aging/softening treatment, for a batch process, is performed under a condition indicated for example as follows:

(Heat treatment temperature) 350° C. or higher and 550° C. or lower, preferably 400° C. or higher and 500° C. or lower (Holding time) more than 4 hours and 40 hours or less, preferably 5 hours or more and 20 hours or less.

The holding time as referred to herein is a period of time for which the above heat treatment temperature is held, and it excludes a period of time for which temperature is raised and that for which temperature is lowered.

The heat treatment temperature and the holding time may be selected from the above ranges depending on the composition, the working state, and the like. In particular, when the heat treatment temperature is selected from a range of 400° C. or higher and lower than 500° C. and the holding time is a relatively a long period of time of more than 4 hours, even 5 hours or more, 6 hours or more, it is easy to obtain copper alloy wire 1 having a high strength of 385 MPa or more and also having high toughness and excellent impact resistance. For a more specific condition, see Test Examples 1 and 2 described later. Note that continuous processing such as a furnace type or an energization type may be used.

For a given composition, a heat treatment performed at high temperature within the above range tends to improve conductivity, elongation at break, impact resistance energy in a state with a terminal attached, and the main wire's impact resistance energy. A heat treatment having a low temperature can suppress growth of crystal grains and also tends to improve tensile strength. When the above precipitate is sufficiently precipitated, high strength is provided, and in addition, conductivity tends to be improved.

In addition, an aging treatment can mainly be performed during wire-drawing, and a softening treatment can mainly be applied to a final stranded fire. The aging treatment and the softening treatment may be performed under conditions selected from the conditions of the aging/softening treatment described above.

Test Example 1

Copper alloy wires of various compositions and covered electrical wires using the obtained copper alloy wires as conductors were manufactured under various manufacturing conditions and had their characteristics examined.

Each copper alloy wire was manufactured in any one of manufacturing patterns (A) to (C) shown in Table 1 (for final wire diameters, see wire diameters (mm) shown in table 3). Each covered electrical wire was manufactured in any one of manufacturing patterns (a) to (c) shown in Table 1.

TABLE 1

| copper alloy wire manufacturing patterns | | | covered electrical wire manufacturing patterns | | |
|---|---|---|---|---|---|
| (A) | (B) | (C) | (a) | (b) | (c) |
| continuous casting (wire diameter: φ30 mm to 12.5 mm) | continuous casting (wire diameter: φ30 mm to 12.5 mm) | continuous casting (wire diameter: φ9.5 mm) | continuous casting (wire diameter: φ30 mm to 12.5 mm) | continuous casting (wire diameter: φ30 mm to 12.5 mm) | continuous casting (wire diameter: φ9.5 mm) |
| ↓ | ↓ | ↓ | ↓ | ↓ | ↓ |
| conform extrusion (wire diameter: φ9.5 mm) | cold rolling (wire diameter: φ9.5 mm) | wire drawing (wire diameter in table 3) | conform extrusion (wire diameter: φ9.5 mm) | cold rolling (wire diameter: φ9.5 mm) | wire drawing (wire diameter: φ0.16 mm) |
| ↓ | ↓ | ↓ | ↓ | ↓ | ↓ |
| wire drawing (wire diameter: φ0.35 mm or φ0.16 mm) | stripping (wire diameter: φ8 mm) | heat treatment (conditions in table 2) | wire drawing (wire diameter: φ0.16 mm) | stripping (wire diameter: φ8 mm) | stranding 7 wires together → compressed stranded wire (cross section: 0.13 mm²) |
| ↓ | ↓ | | ↓ | ↓ | ↓ |
| heat treatment (conditions in table 2) | wire drawing (wire diameter: φ0.35 mm or φ0.16 mm) | | stranding 7 wires together → compressed stranded wire (cross section: 0.13 mm²) | wire drawing (wire diameter: φ0.16 mm) | heat treatment (conditions in table 2) |
| | ↓ | | ↓ | ↓ | ↓ |
| | heat treatment (conditions in table 2) | | heat treatment (conditions in table 2) | stranding 7 wires together → compressed stranded wire (cross section: 0.13 mm²) | extruding insulating material (PVC or PP, thickness: 0.1 mm to 0.3 mm) |
| | | | ↓ | ↓ | |
| | | | extruding insulating material (PVC or PP, thickness: 0.1 mm to 0.3 mm) | heat treatment (conditions in table 2) | |
| | | | | ↓ | |
| | | | | extruding insulating material (PVC or PP, thickness: 0.1 mm to 0.3 mm) | |

In any manufacturing pattern, the following cast material was prepared.

(Cast Material)

Electric copper (purity: 99.99% or higher) and a master alloy containing each element shown in Table 2 or the element in the form of a simple substance were prepared as a raw material. The prepared raw material was molten in an atmosphere of the air in a crucible made of high purity carbon (with impurity in an amount of 20 ppm by mass or less) to prepare molten copper alloy. The copper alloy has compositions (with the balance being Cu and impurities) shown in Table 2.

The molten copper alloy and a high purity carbon mold (with impurity in an amount of 20 ppm by mass or less) were used in an upcast method to prepare a continuous cast material (wire diameter: selected from a range of φ30 mm to φ12.5 mm, or φ9.5 mm) having a circular cross section. The cooling rate exceeded 10° C./sec.

(Covered Electrical Wire)

Figure 3:
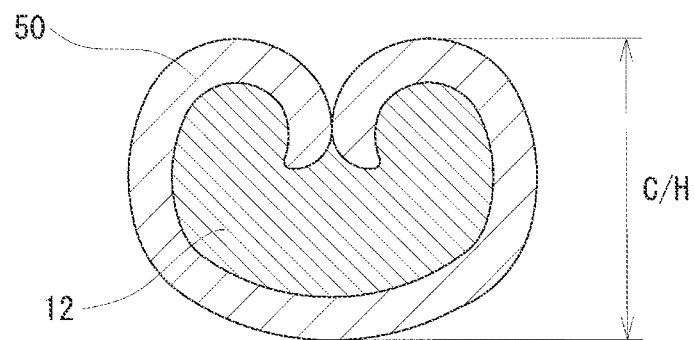
FIG. 3 is a transverse cross-sectional view of the FIG. 2 terminal-equipped electrical wire taken along a line (III)-(III).

In manufacturing patterns (a) to (c), as well as manufacturing patterns (A) to (C) for copper alloy wires, a wire-drawn member having a wire diameter of φ0.16 mm was prepared and 7 such wire-drawn members were twisted together and subsequently compression-molded to prepare a compressed stranded wire having a transverse cross sectional area of 0.13 mm² (0.13 sq) which was in turn subjected to a heat treatment (an aging/softening treatment) under the conditions shown in Table 2. Table 2 indicates a heat treatment condition for time (h), which is a period of time for which a temperature (° C.) indicated in table 2 is held, and it excludes a period of time for which temperature is raised and that for which temperature is lowered. The obtained heat-treated member was surrounded by polyvinyl chloride (PVC) or polypropylene (PP) extruded to have a predetermined thickness (selected from 0.1 mm to 0.3 mm) to thus form an insulating covering layer to thus manufacture a covered electrical wire with the above heat-treated member as a conductor.

at a terminal attachment portion 12 had a transverse cross-sectional area having a value shown in FIG. 3 relative to a transverse cross-sectional area of a portion of the main wire other than the terminal attachment portion (a remaining conductor ratio of 70% or 80%).

Using a general-purpose tensile tester, a maximum load (N) for which the terminal did not escape when the terminal was pulled by 100 mm/min was measured. Let this maximum load be a terminal fixing force.

TABLE 2

| sample | composition | | | | | | | | heat treatment conditions | |
|---|---|---|---|---|---|---|---|---|---|---|
| | mass (% by mass) | | | | ratio | trace components (ppm by mass) | | | temperature | time |
| No. | Cu | Fe | P | Sn | Fe/P | C | Mn | Si | (° C.) | (h) |
| 1-1 | Bal. | 0.45 | 0.11 | 0.21 | 4.1 | 30 | <10 | <10 | 420 | 8 |
| 1-2 | Bal. | 0.45 | 0.11 | 0.21 | 4.1 | 30 | <10 | <10 | 420 | 8 |
| 1-3 | Bal. | 0.45 | 0.11 | 0.21 | 4.1 | 30 | <10 | <10 | 440 | 8 |
| 1-4 | Bal. | 0.68 | 0.15 | 0.34 | 4.5 | 100 | <10 | <10 | 420 | 8 |
| 1-5 | Bal. | 0.68 | 0.15 | 0.34 | 4.5 | 100 | <10 | <10 | 450 | 8 |
| 1-6 | Bal. | 0.68 | 0.15 | 0.34 | 4.5 | 100 | <10 | <10 | 450 | 8 |
| 1-7 | Bal. | 0.99 | 0.24 | 0.49 | 4.1 | 40 | <10 | <10 | 450 | 8 |
| 1-8 | Bal. | 0.99 | 0.24 | 0.49 | 4.1 | 40 | <10 | <10 | 420 | 8 |
| 1-9 | Bal. | 0.61 | 0.20 | 0.30 | 3.1 | 100 | <10 | <10 | 450 | 8 |
| 1-10 | Bal. | 0.48 | 0.19 | 0.20 | 2.5 | 50 | <10 | <10 | 400 | 8 |
| 1-11 | Bal. | 0.60 | 0.05 | 0.70 | 12 | 30 | <10 | <10 | 370 | 8 |
| 1-101 | Bal. | 0.09 | 0.03 | 0.27 | 3 | 40 | <10 | <10 | 350 | 8 |
| 1-102 | Bal. | 0.09 | 0.03 | 0.27 | 3 | 40 | <10 | <10 | 450 | 8 |
| 1-103 | Bal. | 0.57 | 0.3 | 0.4 | 1.9 | 100 | <10 | <10 | 420 | 8 |
| 1-104 | Bal. | 0.57 | 0.3 | 0.4 | 1.9 | 100 | <10 | <10 | 500 | 8 |
| 1-105 | Bal. | 0.3 | 0.1 | 0.15 | 3.0 | 10 | <10 | <10 | 500 | 1.5 |
| 1-106 | Bal. | 0.3 | 0.1 | 0.1 | 3.0 | 30 | <10 | <10 | 450 | 1 |
| 1-107 | Bal. | 0.4 | 0.13 | 0.35 | 3.1 | 60 | <10 | <10 | 450 | 1 |

(Measurement of Characteristics)

The copper alloy wires manufactured in manufacturing patterns (A) to (C) (φ0.35 mm or φ0.16 mm) each had its tensile strength (MPa), elongation at break (%), conductivity (% IACS) and work hardening exponent examined. A result is shown in Table 3.

The conductivity (% IACS) was measured in a bridge method. The tensile strength (MPa), the elongation at break (%) and the work hardening exponent were measured using a general-purpose tensile tester according to JIS Z 2241 (a metal material tensile test method, 1998).

Covered electrical wires manufactured in manufacturing patterns (a) to (c) (conductor's cross-sectional area: 0.13 mm$^2$) had their terminal fixing forces (N) examined. In addition, compressed stranded wires manufactured in manufacturing patterns (a) to (c) were subjected to examination for the conductor's impact resistance energy in a state with a terminal attached (J/m, impact resistance E with terminal attached) and the conductor's impact resistance energy (J/m, impact resistance E). A result is shown in Table 3.

Terminal fixing force (N) is measured as follows: At an end of the covered electrical wire, an insulating covering layer is removed to expose a conductor that is the compressed stranded wire, and a terminal is attached to one end of the compressed stranded wire. Herein, the terminal is a commercially available crimp terminal and crimped to the compressed stranded wire. Furthermore, herein, as shown in FIG. 3, an attachment height (a crimp height C/H) was adjusted so that the conductor (or compressed stranded wire)

The conductor's impact resistance energy (J/m or (N/m)/m) is measured as follows: Before an insulating material is extruded, a weight is attached to a tip of a heat-treated member (i.e., a conductor composed of compressed stranded wire), and the weight is lifted upward by 1 m, and then caused to freely fall. The weight's maximum gravitational weight (kg) for which the conductor does not break is measured, and a product of the gravitational weight, the gravitational acceleration (9.8 m/s$^2$) and the falling distance is divided by the falling distance to obtain a value (i.e., (weight's gravitational weight×9.8×1)/1), which is defined as the conductor's impact resistance energy.

Figure 4:
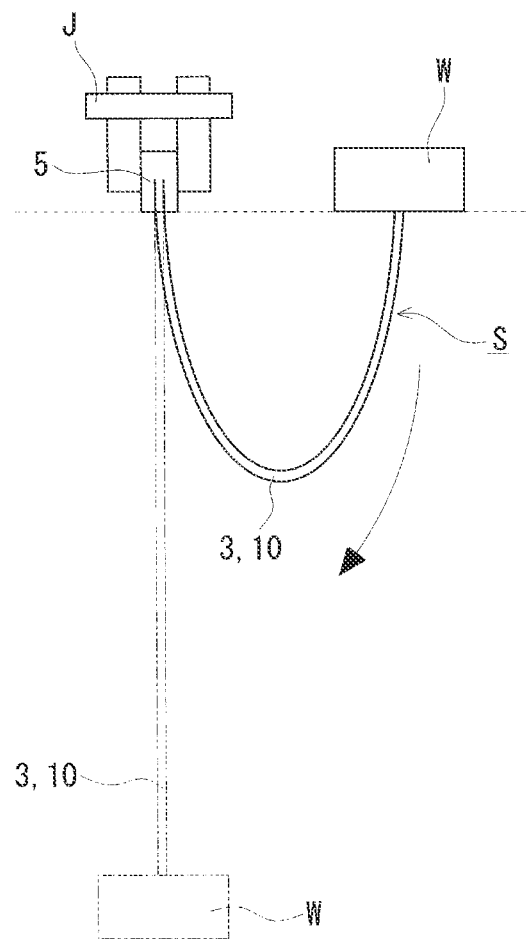
FIG. 4 illustrates a method for measuring "impact resistance energy in a state with a terminal attached" as measured in Test Examples 1 and 2.

The conductor's impact resistance energy in a state with a terminal attached (J/m or (N/m)/m) is measured as follows: As has been done in measuring a terminal fixing force, as has been described above, before an insulating material is extruded, a terminal 5 (herein, a crimp terminal) is attached to one end of a conductor 10 of a heat-treated member (a conductor composed of a compressed stranded wire) to thus prepare a sample S (herein, having a length of 1 m), and terminal 5 is fixed by a jig J as shown in FIG. 4. A weight W is attached to the other end of sample S, and is lifted to the position at which terminal 5 is fixed, and then the weight is caused to freely fall. Similarly as done for the impact resistance energy of the conductor described above, a maximum gravitational weight of weight W for which conductor 10 is not broken is measured, and ((the weight's gravitational weight×9.8×1)/1) is defined as an impact resistance energy in a state with the terminal attached.

TABLE 3

| sample No. | composition (% by mass) | | | | mass ratio Fe/P | characteristics | | | | | |
|---|---|---|---|---|---|---|---|---|---|---|---|
| | Cu | Fe | P | Sn | | wire process | wire diameter (mm) | tensile strength (MPa) | elongation at break (%) | conductivity (% IACS) | work hardening exponent |
| 1-1 | Bal. | 0.45 | 0.11 | 0.21 | 4.1 | C | 0.16 | 463 | 13 | 69 | 0.146 |
| 1-2 | Bal. | 0.45 | 0.11 | 0.21 | 4.1 | C | 0.16 | 463 | 13 | 69 | 0.146 |
| 1-3 | Bal. | 0.45 | 0.11 | 0.21 | 4.1 | C | 0.16 | 416 | 15 | 70 | 0.195 |
| 1-4 | Bal. | 0.68 | 0.15 | 0.34 | 4.5 | A | 0.35 | 487 | 8 | 71 | 0.110 |
| 1-5 | Bal. | 0.68 | 0.15 | 0.34 | 4.5 | A | 0.35 | 420 | 12 | 72 | 0.175 |
| 1-6 | Bal. | 0.68 | 0.15 | 0.34 | 4.5 | A | 0.35 | 420 | 12 | 72 | 0.175 |
| 1-7 | Bal. | 0.99 | 0.24 | 0.49 | 4.1 | B | 0.16 | 451 | 16 | 66 | 0.161 |
| 1-8 | Bal. | 0.99 | 0.24 | 0.49 | 4.1 | B | 0.16 | 560 | 10 | 64 | 0.100 |
| 1-9 | Bal. | 0.61 | 0.20 | 0.30 | 3.1 | B | 0.16 | 480 | 15 | 64 | 0.149 |
| 1-10 | Bal. | 0.48 | 0.19 | 0.20 | 2.5 | B | 0.16 | 546 | 10 | 70 | 0.122 |
| 1-11 | Bal. | 0.60 | 0.05 | 0.70 | 12 | B | 0.16 | 477 | 12 | 72 | 0.141 |
| 1-101 | Bal. | 0.09 | 0.03 | 0.27 | 3 | C | 0.16 | 499 | 7 | 68 | 0.070 |
| 1-102 | Bal. | 0.09 | 0.03 | 0.27 | 3 | C | 0.16 | 313 | 26 | 77 | 0.315 |
| 1-103 | Bal. | 0.57 | 0.3 | 0.4 | 1.9 | C | 0.16 | 569 | 11 | 52 | 0.081 |
| 1-104 | Bal. | 0.57 | 0.3 | 0.4 | 1.9 | C | 0.16 | 381 | 22 | 56 | 0.230 |
| 1-105 | Bal. | 0.3 | 0.1 | 0.15 | 3.0 | C | 0.35 | 296 | 20 | 66 | 0.231 |
| 1-106 | Bal. | 0.3 | 0.1 | 0.1 | 3.0 | C | 0.16 | 480 | 6 | 79 | 0.082 |
| 1-107 | Bal. | 0.4 | 0.13 | 0.35 | 3.1 | C | 0.16 | 540 | 4 | 75 | 0.061 |

| sample No. | process | characteristics (0.13 mm$^2$) | | | |
|---|---|---|---|---|---|
| | | remaining conductor ratio (%) | terminal fixing force (N) | impact resistance E in state with terminal attached (J/m) | impact resistance E (J/m) |
| 1-1 | c | 80 | 67 | 5 | 6.7 |
| 1-2 | c | 70 | 63 | 2 | 6.7 |
| 1-3 | c | 70 | 59 | 4.4 | 7.7 |
| 1-4 | a | 80 | 69 | 2.3 | 5 |
| 1-5 | a | 80 | 61 | 6 | 7.3 |
| 1-6 | a | 70 | 58 | 2.7 | 7.3 |
| 1-7 | b | 80 | 66 | 6.3 | 9.2 |
| 1-8 | b | 80 | 80 | 1.7 | 4.6 |
| 1-9 | b | 80 | 61 | 6.9 | 11.3 |
| 1-10 | b | 80 | 77 | 5.3 | 10.4 |
| 1-11 | b | 80 | 60 | 3.8 | 7.8 |
| 1-101 | c | 80 | 69 | 0.7 | 3.9 |
| 1-102 | c | 70 | 47 | 9.3 | 9.7 |
| 1-103 | c | 80 | 80 | 1.0 | 8.5 |
| 1-104 | c | 70 | 55 | 6.1 | 10.1 |
| 1-105 | c | 80 | 37 | 10.5 | 12.4 |
| 1-106 | c | 80 | 60 | 1.3 | 3.4 |
| 1-107 | c | 80 | 70 | 0.6 | 2.8 |

As shown in Table 3, it can be seen that sample Nos. 1-1 to 1-11 all have conductivity, strength and impact resistance in a better balance than sample Nos. 1-101 to 1-107. Further, sample Nos. 1-1 to 1-11 are also all excellent in impact resistance in a state with a terminal attached. Quantitatively, they are as follows:

Sample Nos. 1-1 to 1-11 all have tensile strength of 385 MPa or more. Furthermore, these samples all have tensile strength of 400 MPa or more, even 415 MPa or more, and there are also many samples having 420 MPa or more.

Sample Nos. 1-1 to 1-11 all have conductivity of 60% IACS or more, even 62% IACS or more, and there are also many samples having 65% IACS or more, even 68% IACS or more.

Sample No. 1-1 to 1-11 all have a conductor having impact resistance energy of 4 J/m or more, even 4.5 J/m or more, and there are also many samples having 5 J/m or more, even 6 J/m or more.

Sample No. 1-1 to 1-11 all have a conductor having impact resistance energy of 1.5 J/m or more, even 1.7 J/m or more in a state with a terminal attached, and there are also many samples having 2.5 J/m or more, even 3 J/m or more. Covered electrical wires of sample Nos. 1-1 to 1-11 including a conductor as described above are expected to have higher impact resistance energy in a state with a terminal attached and higher impact resistance energy of the main wire (see Test Example 2).

Further, sample Nos. 1-1 to 1-11 all have high elongation at break, and it can be seen that the samples have high strength, high toughness and high conductivity in a good balance. Quantitatively, there are also many samples providing elongation at break of 5% or more, even more than 7%, 8% or more, and there are also many samples providing 10% or more. Further, sample Nos. 1-1 to 1-11 all present terminal fixing force of 45 N or more, even 50 N or more, more than 55 N, and it can be seen that they can firmly fix a terminal. In addition, sample Nos. 1-1 to 1-11 all have a work hardening exponent as large as 0.1 or more, and many samples thereof have 0.12 or more, even 0.13 or more, and it can be seen that they easily obtain a strength enhancement effect through work hardening.

A reason for having been able to obtain the above result is considered as follows: Sample Nos. 1 to 1-11 are all composed of a copper alloy having a specific composition including Fe, P, and Sn in a specific range as described above, and undergo a heat treatment as appropriate. Accordingly, it is believed that precipitation of Fe and P and solid solution of Sn were able to be enhanced to provide satisfactorily effectively increased strength, and solid solution of P or the like was able to be reduced based on appropriate precipitation of Fe and P to satisfactorily effectively maintain high conductivity of Cu. Furthermore, it is believed that the above specific composition and appropriate heat treatment were able to enhance precipitation of Fe and P and prevent coarsening and excessive softening of crystals, and thus while high strength of 385 MPa or more was provided, large elongation at break and excellent toughness were also provided, and even when an impact was received, breakage was hard to occur, and excellent impact resistance was thus also obtained (for example, see sample Nos. 1-101 and 1-102 for comparison). In this test, it can be said that it is preferable to set the heat treatment temperature at a temperature selected from a range of 350° C. or higher and less than 500° C., and the holding time to be longer than 4 hours (for example, see samples Nos. 1-105 to 1-107 for comparison). Furthermore, it can be said that, in this test, in addition to adjusting a heat treatment condition, as described above, a copper alloy having a specific composition, that is, a mass ratio of Fe/P of 4.0 or more, more easily increases conductivity and hence easily has conductivity as high as 60% IACS or more (for example, see sample Nos. 1-103 and 1-104 for comparison). Note that it is believed that sample Nos. 1-105 to 1-107 more easily became high in conductivity than sample Nos. 1-1 to 1-11 since the former contained additive elements in a smaller amount than the latter.

Furthermore, herein, it is believed that appropriately containing C, Mn and Si and thereby causing these elements to function as antioxidants prevented oxidation of Fe, P, and Sn and thus enabled appropriate precipitation of Fe and P and appropriate solid solution of Sn. Furthermore, it is believed that reduction in conductivity due to containing C, Mn and Si was also able to be suppressed. It is believed that the above result was obtained in this test because a content of C of 100 ppm by mass or less, a total content of Mn and Si of 20 ppm by mass or less, a total content of these three elements of 150 ppm by mass or less, 120 ppm by mass or less in particular, allowed the above antioxidation effect and conductivity reduction suppressing effect to be appropriately obtained.

It is believed that one reason for large terminal fixing force is that tensile strength was high strength as high as 385 MPa or more, and in addition, a work hardening exponent as large as 0.1 or more allowed work-hardening to provide a strength enhancement effect. For example, Sample Nos. 1-1 and 1-101, which have different work hardening exponents and identical conditions for attaching a terminal (or the same remaining conductor ratio) will be compared. Although sample No. 1-1 is lower in tensile strength than sample No. 1-101, the former has a terminal fixing force of a level equivalent to that of the latter and in addition, significantly larger impact resistance energy in a state with the terminal attached than the latter. It is believed that sample No. 1-1 compensated for the small tensile strength by work hardening. Furthermore, it is believed the conductor had a terminal attachment portion satisfactorily effectively enhanced in strength through work-hardening accompanying compression-working, and was thus also excellent in impact resistance in a state with a terminal attached. In addition, in this test, when noting tensile strength and terminal fixing force, it can be said that there is a correlation such that terminal fixing force increases as tensile strength increases.

This test has indicated that applying plastic-working such as wire-drawing and a heat treatment such as an aging/softening treatment to a copper alloy having a specific composition including Fe, P and Sn in a specific range as described above can provide a copper alloy wire and a copper alloy stranded wire excellently conductive and excellent in strength, and in addition, also excellent in impact resistance, and a covered electrical wire and a terminal-equipped electrical wire using the copper alloy wire and the copper alloy stranded wire as a conductor. In addition, it can be seen that even the same composition can be varied in tensile strength, conductivity, impact resistance energy and the like by adjusting the heat treatment's condition (for example, see comparison between sample No. 1-2 and No. 1-3, comparison between sample No. 1-4 and No. 1-5, and comparison between sample No. 1-7 and No. 1-8). For example, when the heat treatment's temperature is raised, the conductivity and the conductor's impact resistance energy tend to be high. In addition, as the Sn content increases, the tensile strength tends to be higher (for example, see and compare sample Nos. 1-8, 1-4 and 1-2).

Test Example 2

Similarly as has been done in test example 1, copper alloy wires of various compositions and covered electrical wires using the obtained copper alloy wires as conductors were manufactured under various manufacturing conditions and had their characteristics examined.

In this test, a copper alloy wire (a heat-treated member) having a wire diameter of 0.16 mm was produced in manufacturing pattern (B) of Test Example 1. A heat treatment was performed in conditions as shown in Table 4. Furthermore, similarly as has been done in test example 1, the obtained copper alloy wire (having a wire diameter of 0.16 mm) had its conductivity (% IACS), tensile strength (MPa), elongation at break (%), and work hardening exponent examined. A result thereof is shown in Table 4.

Manufacturing pattern (b) of test example 1 was used to prepare a wire-drawn member having a wire diameter of 0.16 mm and 7 such wire-drawn members were twisted together and subsequently compression-molded to prepare a compressed stranded wire having a transverse cross sectional area of 0.13 mm$^2$ which was in turn subjected to a heat treatment under the conditions shown in Table 5. The obtained heat-treated member was surrounded by an insulating material (PVC or PP) extruded to have a thickness shown in Table 5 (0.20 mm or 0.23 mm) to thus form an insulating covering layer to thus manufacture a covered electrical wire with the above heat-treated member as a conductor.

The obtained heat-treated member (a conductor composed of a compressed wire member) had its load at break (N), elongation at break (%), and electric resistance per 1 m (mΩ/m) examined. The obtained covered electrical wire had its load at break (N), elongation at break (%), and impact resistance energy (J/m) of the main wire examined. A result thereof is shown in table 5.

Load at break (N) and elongation at break (%) were measured using a general-purpose tensile tester in conformity to JIS Z 2241 (a metal material tensile test method, 1998). Electrical resistance was measured in accordance with JASO D 618 and a resistance measuring device of a four terminal method was used to measure a resistance value for a length of 1 m. The main wire's impact resistance energy was measured in the same manner as in Test Example 1, with the covered electrical wire as a target to be tested.

The obtained covered electrical wire had its impact resistance energy (J/m) measured in a state of with a terminal attached. A result thereof is shown in table 6. In this test, at an end of covered electrical wire 3, an insulating covering layer was removed to expose a conductor that is a compressed stranded wire, and a crimp terminal was attached as terminal 5 to one end of the compressed stranded wire, and measurement was done in a manner similar to that in test example 1 (see FIG. 4). As the crimp terminal was prepared a crimp terminal formed by press-forming a metal plate (made of a copper alloy) into a predetermined shape, and including fitting portion 52, wire barrel portion 50, and insulation barrel portion 54 (an overlapping type) as shown in FIG. 2. Here, a variety of types of crimp terminals composed of metal plates having thicknesses (mm) shown in Table 6 and having surfaces plated with plating material types shown in Table 6 (tin (Sn) or gold (Au)) were prepared, and attached to a conductor of a covered electrical wire of each sample such that wire barrel portion 50 had an attachment height (C/H (mm)) and insulation barrel portion 54 has an attachment height (V/H (mm)) as shown in Table 6.

TABLE 4

| sample No. | composition | | | | | trace components (ppm by mass) | | | heat treatment conditions | | characteristics (φ0.16 mm) | | | |
|---|---|---|---|---|---|---|---|---|---|---|---|---|---|---|
| | (% by mass) | | | | mass ratio | | | | | | tensile strength | elongation at break | conductivity | work hardening |
| | Cu | Fe | P | Sn | Fe/P | C | Mn | Si | process | temperature (° C.) | time (h) | (MPa) | (%) | (% IACS) | exponent |
| 2-11 | Bal. | 0.61 | 0.14 | 0.31 | 4.4 | 40 | <10 | <10 | B | 450 | 8 | 515 | 12 | 63 | 0.122 |
| 2-12 | Bal. | 0.57 | 0.13 | 0.31 | 4.4 | 40 | <10 | <10 | B | 440 | 8 | 461 | 13 | 65 | 0.121 |
| 2-13 | Bal. | 0.63 | 0.15 | 0.26 | 4.2 | 40 | <10 | <10 | B | 440 | 8 | 493 | 11 | 65 | 0.121 |
| 2-14 | Bal. | 0.61 | 0.15 | 0.14 | 4.1 | 40 | <10 | <10 | B | 440 | 8 | 469 | 12 | 71 | 0.139 |
| 2-101 | Bal. | 0.09 | 0.03 | 0.27 | 3 | 40 | <10 | <10 | B | 350 | 8 | 499 | 7 | 68 | 0.07 |

TABLE 5

| sample No. | conditions for heat treatment for conductor | | conductor's characteristics (0.13 mm²) | | | electrical wire's cover | | electrical wire's characteristics | | |
|---|---|---|---|---|---|---|---|---|---|---|
| | temperature (° C.) | time (h) | load at break (N) | elongation at break (%) | electrical resistance (mΩ/m) | insulating cover | insulation thickness (mm) | load at break (N) | elongation at break (%) | impact resistance E (J/m) |
| 2-11 | 450 | 8 | 68 | 12 | 201 | PVC | 0.23 | 85 | 14 | 12.5 |
| 2-12 | 440 | 8 | 61 | 13 | 194 | PVC | 0.23 | 81 | 15 | 12.6 |
| 2-13 | 440 | 8 | 65 | 11 | 192 | PVC | 0.23 | 82 | 13 | 11.3 |
| | | | | | | PP | 0.20 | 84 | 13 | 11.9 |
| | | | | | | PP | 0.23 | 87 | 13 | 12.3 |
| 2-14 | 440 | 8 | 62 | 12 | 177 | PVC | 0.23 | 78 | 14 | 11.5 |
| 2-101 | 350 | 8 | 66 | 7 | 184 | PVC | 0.23 | 81 | 9 | 7.3 |

TABLE 6

| | | impact resistance energy in state with terminal attached (J/m) condition No. | | | | | | | | | |
|---|---|---|---|---|---|---|---|---|---|---|---|
| | | 1 | 2 | 3 | 4 | 5 | 6 | 7 | 8 | 9 | 10 |
| | | terminal plate thickness (mm) (terminal plating material type) | | | | | | | | | |
| | | 0.15 (Sn) | 0.25 (Sn) | 0.25 (Au) | 0.25 (Sn) | 0.25 (Au) | 0.2 (Sn) | 0.25 (Sn) | 0.25 (Sn) | 0.25 (Sn) | 0.25 (Sn) |
| | | V/H mm | | | | | | | | | |
| sample No. | covering material type and crimping condition | 1.10 | 1.45 | 1.45 | 1.45 | 1.45 | 1.00 | 1.40 | 1.35 | 1.30 | 1.25 |
| | | C/H mm | | | | | | | | | |
| | | 0.61 | 0.76 | 0.75 | 0.75 | 0.79 | 0.64 | 0.75 | 0.75 | 0.75 | 0.75 |
| 2-11 | PVC 0.23 mm | 3.9 | 5.4 | 4.9 | 4.4 | 5.4 | 6.4 | 4.4 | 4.9 | 4.4 | 3.9 |
| 2-12 | PVC 0.23 mm | 3.9 | 6.4 | 5.4 | 4.4 | 5.4 | 6.4 | 4.4 | — | — | — |
| 2-13 | PVC 0.23 mm | 3.9 | 5.4 | 4.9 | 4.4 | 5.4 | 6.4 | 4.4 | — | — | — |
| | PP 0.20 mm | 4.4 | 5.9 | 5.4 | 5.9 | 5.9 | 6.9 | 4.9 | — | — | — |
| | PP 0.23 mm | 4.9 | 6.4 | 5.9 | 6.4 | 6.4 | 7.4 | 5.4 | — | — | — |

TABLE 6-continued

| | | impact resistance energy in state with terminal attached (J/m) condition No. | | | | | | | | | |
|---|---|---|---|---|---|---|---|---|---|---|---|
| | | 1 | 2 | 3 | 4 | 5 | 6 | 7 | 8 | 9 | 10 |
| | | | | | | terminal plate thickness (mm) (terminal plating material type) | | | | | |
| | | 0.15 (Sn) | 0.25 (Sn) | 0.25 (Au) | 0.25 (Sn) | 0.25 (Au) | 0.2 (Sn) | 0.25 (Sn) | 0.25 (Sn) | 0.25 (Sn) | 0.25 (Sn) |
| | | | | | | V/H mm | | | | | |
| sample | covering material type and crimping | 1.10 | 1.45 | 1.45 | 1.45 | 1.45 | 1.00 | 1.40 | 1.35 | 1.30 | 1.25 |
| | | | | | | C/H mm | | | | | |
| No. | condition | 0.61 | 0.76 | 0.75 | 0.75 | 0.79 | 0.64 | 0.75 | 0.75 | 0.75 | 0.75 |
| 2-14 | PVC 0.23 mm | 3.9 | 6.4 | 5.4 | 4.4 | 5.4 | 6.4 | 4.4 | — | — | — |
| 2-101 | PVC 0.23 mm | 1.0 | 2.5 | 2.0 | 1.5 | 2.5 | 3.0 | 1.5 | 2.0 | 1.5 | 1.0 |

As shown in Tables 4 and 5, it can be seen that sample Nos. 2-11 to 2-14 are all excellent in conductivity, strength and impact resistance in a good balance as compared with sample No. 2-101 having the same wire diameter or having a conductor with the same cross sectional area. Further, as shown in FIG. 6, sample Nos. 2-11 to 2-14 are also all excellent in impact resistance in a state with a terminal attached. Quantitatively, they are as follows:

Sample Nos. 2-11 to 2-14 all have tensile strength of 385 MPa or more. Furthermore, these samples all have tensile strength of 400 MPa or more, even 450 MPa or more (see Table 4).

Sample Nos. 2-11 to 2-14 all have conductivity of 60% IACS or more, even 62% IACS or more (see Table 4).

Sample Nos. 2-11 to 2-14 all have the main wire's impact resistance energy of 9 J/m or more, even 10 J/m or more (see Table 5).

Sample Nos. 2-11 to 2-14 in a state with a terminal attached all have impact resistance energy of 3 J/m or more, even 3.5 J/m or more, 3.8 J/m or more, and there are also many samples having 4 J/m or more (see Table 6).

In this test, it can be said that even if C/H and V/H are the same, changing the terminal's plating material type, cover type, covering thickness and the like may further enhance impact resistance energy in the state with the terminal attached (for example, compare condition No. 2 and condition No. 3 in Table 6). Furthermore, in this test, it can be said that even when the same crimp terminal is used, changing V/H (in this case, increasing V/H) tends to further enhance impact resistance energy in the state with the terminal attached (for example, compare conditions No. 2, No. 4, No. 7 to No. 10 in Table 6).

Further, as shown in Table 4, sample Nos. 2-11 to 2-14 all have an elongation at break of 5% or more, even 10% or more, and it can be seen that they have high strength, high toughness and high conductivity in a good balance, similarly as seen in test example 1. Further, as shown in Table 5, it can be said that a compressed stranded wire is larger in tensile strength (load at break/cross sectional area) than a solid wire (see conductor's characteristics) and furthermore, it can be said that a covered electrical wire having an insulating covering layer can enhance tensile strength more than a compressed stranded wire (see electrical wire's characteristics). It can be said that even a compressed stranded wire can maintain a solid wire's elongation at break (see characteristics in Table 4 and conductor's characteristics in Table 5 and compare them) and it can be said that a covered electrical wire including an insulating covering layer can improve elongation at break more than the compressed stranded wire (see the table 5 conductor's characteristics and electrical wire's characteristics and compare them). It can be said that the covered electrical wire including the insulating covering layer tends to have higher impact resistance energy in a state with a terminal attached and higher impact resistance energy of the main wire than a case with a conductor alone as shown in test example 1.

In addition, sample Nos. 2-11 to 2-14 all have a work hardening exponent of 0.1 or more, even 0.12 or more. It is believed that such sample Nos. 2-11 to No. 2-14 can all fix a terminal firmly, and are excellent in impact resistance in a state with the terminal attached and in addition, also excellently fix the terminal.

One reason for having been able to obtain the above result is considered as follows: similarly as in test example 1, comprising a copper alloy having a specific composition including Fe, P and Sn in a specific range, and performing an appropriate heat treatment, were able to enhance precipitation of Fe and P and solid solution of Sn to provide satisfactorily effectively increased strength, and were able to reduce solid solution of P or the like to satisfactorily effectively maintain high conductivity of Cu. Furthermore, it is believed that, by an appropriate heat treatment, excellent toughness was also provided while tensile strength is high strength as high as 385 MPa, and excellent impact resistance and excellent impact resistance in a state with a terminal attached were thus also provided. In particular, as well as in test example 1, it is believed that appropriately containing C, Mn and Si effectively prevented oxidation of Fe, P, Sn and containing C or a like deoxidant element effectively suppressed reduction in conductivity.

The present invention is defined by the terms of the claims, rather than the examples described above, and is intended to include any modifications within the meaning and scope equivalent to the terms of the claims.

For example, the copper alloy's composition, the copper alloy wire's wire diameter, how many wires are twisted together, and a heat treatment condition in Test Examples 1 and 2 can be changed as appropriate.

[Additional Notes]

As a covered electrical wire, a terminal-equipped electrical wire, a copper alloy wire, and a copper alloy stranded wire which are excellently conductive and excellent in strength, and in addition, also excellent in impact resistance, the following configuration can be made. The following configuration has Fe/P within a specific range, and accordingly, helps to form a compound without excess or deficiency of Fe and P, as described above, and as a result, enhanced precipitation can effectively enhance strength more appropriately, and excessive solid solution of P can be reduced to effectively maintain the matrix phase's high conductivity, as appropriate.

[Additional Note 1]

A covered electrical wire comprising a conductor and an insulating covering layer provided outside the conductor, the conductor being a stranded wire composed of a strand of a plurality of copper alloy wires:

composed of a copper alloy containing

Fe in an amount of 0.1% by mass or more and 1.6% by mass or less,

P in an amount of 0.05% by mass or more and 0.7% by mass or less, and

Sn in an amount of 0.05% by mass or more and 0.7% by mass or less, with the balance being Cu and impurities, and having a mass ratio of Fe/P of 4.0 or more; and having a wire diameter of 0.5 mm or less.

[Additional Note 2]

A terminal-equipped electrical wire comprising a covered electrical wire indicated in [additional note 1] and a terminal attached to an end of the covered electrical wire.

[Additional Note 3]

A copper alloy wire used for a conductor, the copper alloy wire:

being composed of a copper alloy containing

Fe in an amount of 0.1% by mass or more and 1.6% by mass or less,

P in an amount of 0.05% by mass or more and 0.4% by mass or less, and

Sn in an amount of 0.05% by mass or more and 0.7% by mass or less, with the balance being Cu and impurities, and having a mass ratio of Fe/P of 4.0 or more; and having a wire diameter of 0.5 mm or less.

[Additional Note 4]

A copper alloy stranded wire formed of a strand of a plurality of copper alloy wires each indicated in [additional note 3].

REFERENCE SIGNS LIST

1 copper alloy wire,
  10 copper alloy stranded wire (conductor),
  12 terminal attachment portion,
2 insulating coating layer,
3 covered electrical wire,
4 terminal-equipped electrical wire,
5 terminal,
  50 wire barrel portion,
  52 fitting portion,
  54 insulation barrel portion,
S sample,
J jig,
W weight

The invention claimed is:

1. A covered electrical wire comprising a conductor and an insulating covering layer provided outside the conductor,
    the conductor being a stranded wire composed of a strand of a plurality of copper alloy wires:
    composed of a copper alloy consisting of
        Fe in an amount of 0.1% by mass or more and 1.6% by mass or less,
        P in an amount of 0.05% by mass or more and 0.7% by mass or less,
        Sn in an amount of 0.05% by mass or more and 0.7% by mass or less, and
        C, Si, and Mn in an amount of more than 30 ppm and less than 70 ppm by mass in total and C is contained in an amount of 30 ppm or more,
        with the balance being Cu and impurities, and
    each copper alloy wire having a wire diameter of 0.5 mm or less,
    the copper alloy wire having a tensile strength of 385 MPa or more and a work-hardening exponent of 0.1 or more,
    wherein the copper alloy has a mass ratio of Fe/P of 4.0 or more.

2. The covered electrical wire according to claim 1, wherein the copper alloy wire provides an elongation at break of 5% or more.

3. The covered electrical wire according to claim 1, wherein the copper alloy wire has a conductivity of 60% IACS or more and a tensile strength of 400 MPa or more.

4. The covered electrical wire according to claim 1, having a terminal fixing force of 45 N or more.

5. The covered electrical wire according to claim 1, having an impact resistance energy of 3 J/m or more in a state with a terminal attached.

6. The covered electrical wire according to claim 1, wherein an impact resistance energy of the covered electrical wire is 6 J/m or more.

7. A terminal-equipped electrical wire comprising a covered electrical wire according to claim 1 and a terminal attached to an end of the covered electrical wire.

\* \* \* \* \*